(12) United States Patent
Audet et al.

(10) Patent No.: US 9,646,080 B2
(45) Date of Patent: May 9, 2017

(54) MULTI-FUNCTIONS AXIS-BASED INTERFACE

(71) Applicant: 9224-5489 QUEBEC INC., Montreal (CA)

(72) Inventors: Mathieu Audet, Montreal (CA); Francois Cassistat, Montreal (CA)

(73) Assignee: 9224-5489 QUEBEC INC., Montreal (CA)

( * ) Notice: Subject to any disclaimer, the term of this patent is extended or adjusted under 35 U.S.C. 154(b) by 322 days.

(21) Appl. No.: 13/841,983

(22) Filed: Mar. 15, 2013

(65) Prior Publication Data

US 2013/0332459 A1 Dec. 12, 2013

Related U.S. Application Data

(60) Provisional application No. 61/658,619, filed on Jun. 12, 2012.

(51) Int. Cl.
*G06F 17/30* (2006.01)
*G06Q 10/10* (2012.01)

(52) U.S. Cl.
CPC .. *G06F 17/30705* (2013.01); *G06F 17/30011* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 4,616,336 A | 10/1986 | Robertson | |
| 4,653,021 A | 3/1987 | Takagi | |
| 4,817,036 A | 3/1989 | Millet et al. | |
| 5,115,504 A | 5/1992 | Belove | |
| 5,148,154 A | 9/1992 | MacKay | |
| 5,241,624 A | 8/1993 | Torres | |
| 5,261,087 A | 11/1993 | Mukaino | |
| 5,398,074 A | 3/1995 | Duffield | |
| 5,414,811 A | 5/1995 | Parulski et al. | |
| 5,499,330 A | 3/1996 | Lucas et al. | |
| 5,524,195 A | 6/1996 | Clanton | |

(Continued)

FOREIGN PATENT DOCUMENTS

| | | |
|---|---|---|
| JP | 07-013971 | 1/1995 |
| JP | 07-085080 | 3/1995 |

(Continued)

OTHER PUBLICATIONS

The lifestream approach to reorganizing the information world; Nicolas Carriero, Scott Fertig; Eric Freeman and David Gelernter; Apr. 1995; Yale University.

*Primary Examiner* — Belix M Ortiz Ditren

(74) *Attorney, Agent, or Firm* — Matthieu Audet

(57) ABSTRACT

A method, device, interface and systems thereof is hereby presented to facilitate interactions between sets of attributes and workflow steps with corresponding graphical arrangements of associated documents. Interactions are generally facilitated through an interaction tool having input and output capabilities. Documents can be classified by associating documents with an interaction element from the interaction tool. Conversely, selecting an interaction element is used as a basis to display documents corresponding to the attributes associated with the selected interaction element.

19 Claims, 34 Drawing Sheets

(56) References Cited

U.S. PATENT DOCUMENTS

| | | |
|---|---|---|
| 5,535,063 A | 7/1996 | Lamming |
| 5,546,528 A | 8/1996 | Johnston |
| 5,581,752 A | 12/1996 | Inoue |
| 5,598,519 A | 1/1997 | Narayanan |
| 5,602,596 A | 2/1997 | Claussen |
| 5,606,374 A | 2/1997 | Bertram |
| 5,621,456 A | 4/1997 | Florin |
| 5,621,874 A | 4/1997 | Lucas |
| 5,623,613 A | 4/1997 | Rowe |
| 5,634,064 A | 5/1997 | Warnock |
| 5,649,182 A | 7/1997 | Reitz |
| 5,659,742 A | 8/1997 | Beattie |
| 5,663,757 A | 9/1997 | Morales |
| 5,671,381 A | 9/1997 | Strasnick |
| 5,673,401 A | 9/1997 | Volk |
| 5,677,708 A | 10/1997 | Matthews |
| 5,680,605 A | 10/1997 | Torres |
| 5,682,511 A | 10/1997 | Sposato |
| 5,701,500 A | 12/1997 | Ikeo |
| 5,713,031 A | 1/1998 | Saito |
| 5,740,815 A | 4/1998 | Alpins |
| 5,781,188 A | 7/1998 | Amiot |
| 5,781,785 A | 7/1998 | Rowe |
| 5,794,178 A | 8/1998 | Caid |
| 5,798,766 A | 8/1998 | Hayashi et al. |
| 5,812,124 A | 9/1998 | Eick |
| 5,822,751 A | 10/1998 | Gray |
| 5,832,504 A | 11/1998 | Tripathi |
| 5,838,317 A | 11/1998 | Bolnick |
| 5,838,326 A | 11/1998 | Card |
| 5,847,707 A | 12/1998 | Hayashida |
| 5,850,218 A | 12/1998 | Lajoie |
| 5,878,410 A | 3/1999 | Zbikowski |
| 5,900,879 A | 5/1999 | Berry |
| 5,903,271 A | 5/1999 | Bardon |
| 5,905,992 A | 5/1999 | Lucas |
| 5,920,859 A | 7/1999 | Li |
| 5,926,824 A | 7/1999 | Hashimoto |
| 5,933,843 A | 8/1999 | Takai |
| 5,974,391 A | 10/1999 | Hongawa et al. |
| 5,977,974 A | 11/1999 | Hatori et al. |
| 5,980,096 A | 11/1999 | Thalhammer-Reyero |
| 5,982,369 A | 11/1999 | Sciammarella |
| 6,003,034 A | 12/1999 | Thli |
| 6,005,601 A | 12/1999 | Ohkura |
| 6,006,227 A | 12/1999 | Freeman |
| 6,009,442 A | 12/1999 | Chen |
| 6,012,072 A | 1/2000 | Lucas |
| 6,020,930 A | 2/2000 | Legrand |
| 6,023,703 A | 2/2000 | Hill |
| 6,028,600 A | 2/2000 | Rosin |
| 6,029,164 A | 2/2000 | Birrell |
| 6,037,933 A | 3/2000 | Blonstein |
| 6,038,522 A | 3/2000 | Manson et al. |
| 6,064,384 A | 5/2000 | Ho |
| 6,067,554 A | 5/2000 | Hohensee |
| 6,081,817 A | 6/2000 | Taguchi |
| 6,088,032 A | 7/2000 | Mackinlay |
| 6,100,887 A | 8/2000 | Bormann et al. |
| 6,108,657 A | 8/2000 | Shoup |
| 6,111,578 A | 8/2000 | Tesler |
| 6,119,120 A | 9/2000 | Miller |
| 6,149,519 A | 11/2000 | Osaki |
| 6,151,059 A | 11/2000 | Schein |
| 6,151,604 A | 11/2000 | Wlaschin |
| 6,151,702 A | 11/2000 | Overturf |
| 6,163,345 A | 12/2000 | Noguchi |
| 6,175,362 B1 | 1/2001 | Harms |
| 6,175,845 B1 | 1/2001 | Smith |
| 6,185,551 B1 | 2/2001 | Birrell |
| 6,188,406 B1 | 2/2001 | Fong |
| 6,189,012 B1 | 2/2001 | Mital |
| 6,202,068 B1 | 3/2001 | Kraay |
| 6,211,873 B1 | 4/2001 | Moyer |
| 6,236,994 B1 | 5/2001 | Swartz |
| 6,237,004 B1 | 5/2001 | Dodson |
| 6,240,421 B1 | 5/2001 | Stolarz |
| 6,243,093 B1 | 6/2001 | Czerwinski |
| 6,243,724 B1 | 6/2001 | Mander |
| 6,253,218 B1 | 6/2001 | Aoki |
| 6,262,722 B1 | 7/2001 | Allison |
| 6,266,059 B1 | 7/2001 | Mattews |
| 6,266,098 B1 | 7/2001 | Cove |
| 6,281,898 B1 | 8/2001 | Nikolovska |
| 6,281,940 B1 | 8/2001 | Sciammarella |
| 6,289,362 B1 | 9/2001 | Van Der Meer |
| 6,295,639 B1 | 9/2001 | Van Der Meer |
| 6,308,187 B1 | 10/2001 | Destefano |
| 6,310,622 B1 | 10/2001 | Asente |
| 6,313,851 B1 | 11/2001 | Matthews |
| 6,317,761 B1 | 11/2001 | Landsman et al. |
| 6,335,742 B1 | 1/2002 | Takemoto |
| 6,337,698 B1 | 1/2002 | Keely, Jr. |
| 6,338,044 B1 | 1/2002 | Cook et al. |
| 6,344,880 B1 | 2/2002 | Takahashi |
| 6,353,831 B1 | 3/2002 | Gustman |
| 6,366,299 B1 | 4/2002 | Lanning |
| 6,380,953 B1 * | 4/2002 | Mizuno ............. G06F 3/04855 |
| | | 715/764 |
| 6,381,362 B1 | 4/2002 | Desphande et al. |
| 6,388,665 B1 | 5/2002 | Linnett |
| 6,392,651 B1 | 5/2002 | Stradley |
| 6,418,556 B1 | 7/2002 | Bennington |
| 6,425,129 B1 | 7/2002 | Sciammarella |
| 6,434,545 B1 | 8/2002 | MacLeod et al. |
| 6,434,598 B1 | 8/2002 | Gish |
| 6,456,938 B1 | 9/2002 | Barnard |
| 6,457,006 B1 | 9/2002 | Gruenwald |
| 6,457,017 B2 | 9/2002 | Watkins |
| 6,463,431 B1 | 10/2002 | Schmitt |
| 6,466,237 B1 | 10/2002 | Miyao et al. |
| 6,487,557 B1 | 11/2002 | Nagatomo et al. |
| 6,491,585 B1 | 12/2002 | Miyamoto |
| 6,501,469 B1 | 12/2002 | MacPhail |
| 6,507,858 B1 | 1/2003 | Kanerva |
| 6,538,672 B1 | 3/2003 | Dobbelaar |
| 6,542,896 B1 | 4/2003 | Gruenwald |
| 6,553,310 B1 | 4/2003 | Lopke |
| 6,556,225 B1 | 4/2003 | MacPhail |
| 6,577,350 B1 | 6/2003 | Proehl |
| 6,581,068 B1 | 6/2003 | Bensoussan et al. |
| 6,587,106 B1 | 7/2003 | Suzuki et al. |
| 6,594,673 B1 | 7/2003 | Smith |
| 6,598,043 B1 | 7/2003 | Baclawski |
| 6,600,501 B1 | 7/2003 | Israel |
| D478,090 S | 8/2003 | Nguyen |
| 6,604,144 B1 | 8/2003 | Anders |
| 6,613,100 B2 | 9/2003 | Miller |
| 6,636,246 B1 | 10/2003 | Gallo |
| 6,638,313 B1 | 10/2003 | Freeman |
| 6,642,939 B1 | 11/2003 | Vallone |
| 6,650,343 B1 | 11/2003 | Fujita |
| 6,662,357 B1 | 12/2003 | Bowman-Amuah |
| 6,668,102 B2 | 12/2003 | Chiba |
| 6,671,692 B1 | 12/2003 | Marpe |
| 6,671,693 B1 | 12/2003 | Marpe |
| 6,671,694 B2 | 12/2003 | Baskins et al. |
| 6,675,158 B1 | 1/2004 | Rising |
| 6,678,671 B1 | 1/2004 | Petrovic |
| 6,678,694 B1 | 1/2004 | Zimmermann |
| 6,678,891 B1 | 1/2004 | Wilcox |
| 6,684,249 B1 | 1/2004 | Frerichs et al. |
| 6,690,391 B1 | 2/2004 | Proehl |
| 6,691,127 B1 | 2/2004 | Bauer |
| 6,694,326 B2 | 2/2004 | Mayhew |
| 6,694,335 B1 | 2/2004 | Hopmann |
| 6,694,486 B2 | 2/2004 | Frank |
| 6,701,318 B2 | 3/2004 | Fox |
| 6,704,727 B1 | 3/2004 | Kravets |
| 6,704,744 B1 | 3/2004 | Williamson |
| 6,721,760 B1 | 4/2004 | Ono et al. |
| 6,725,232 B2 | 4/2004 | Bradley |
| 6,725,427 B2 | 4/2004 | Freeman |
| 6,735,591 B2 | 5/2004 | Khan |

(56) References Cited

U.S. PATENT DOCUMENTS

| | | |
|---|---|---|
| 6,738,787 B2 | 5/2004 | Stead |
| 6,744,447 B2 | 6/2004 | Estrada et al. |
| 6,744,967 B2 | 6/2004 | Kaminski et al. |
| 6,754,660 B1 | 6/2004 | MacPhail |
| 6,768,999 B2 | 7/2004 | Prager |
| 6,772,148 B2 | 8/2004 | Baclawski |
| 6,859,803 B2 | 2/2005 | Dagtas |
| 6,862,027 B2 | 3/2005 | Andrews |
| 6,865,717 B2 | 3/2005 | Wright et al. |
| 6,879,946 B2 | 4/2005 | Rong |
| 6,889,220 B2 | 5/2005 | Wolff |
| 6,900,807 B1 | 5/2005 | Liongosari et al. |
| 6,901,558 B1 | 5/2005 | Andreas et al. |
| 6,915,254 B1 | 7/2005 | Heinze |
| 6,915,489 B2 | 7/2005 | Gargi |
| 6,922,699 B2 | 7/2005 | Schuetze |
| 6,925,611 B2 | 8/2005 | SanGiovanni |
| 6,927,770 B2 | 8/2005 | Ording et al. |
| 6,934,916 B1 | 8/2005 | Webb et al. |
| 6,948,124 B2 | 9/2005 | Combs |
| 6,961,900 B1 | 11/2005 | Sprague et al. |
| 6,965,380 B1 | 11/2005 | Kumata et al. |
| 6,973,628 B2 | 12/2005 | Asami |
| 6,983,227 B1 | 1/2006 | Thalhammer-Reyero et al. |
| 6,985,948 B2 | 1/2006 | Taguchi et al. |
| 6,987,220 B2 | 1/2006 | Holcombe |
| 7,007,034 B1 | 2/2006 | Hartman |
| 7,010,744 B1 | 3/2006 | Torgerson |
| 7,019,741 B2 | 3/2006 | Kelly et al. |
| 7,020,848 B2 | 3/2006 | Rosenzweig |
| 7,055,104 B2 | 5/2006 | Billmaier |
| 7,080,394 B2 | 7/2006 | Istvan |
| 7,088,859 B1 | 8/2006 | Yamaguchi |
| 7,107,531 B2 | 9/2006 | Billmaier |
| 7,107,532 B1 | 9/2006 | Billmaier |
| 7,113,975 B2 | 9/2006 | Nakayama |
| 7,117,199 B2 | 10/2006 | Frank |
| 7,137,067 B2 | 11/2006 | Yanase |
| 7,139,006 B2 | 11/2006 | Wittenburg |
| 7,149,983 B1 | 12/2006 | Robertson |
| 7,155,675 B2 | 12/2006 | Billmaier |
| 7,159,177 B2 | 1/2007 | Billmaier |
| 7,199,809 B1 | 4/2007 | Lacy |
| 7,234,114 B2 | 6/2007 | Kurtz |
| 7,266,768 B2 | 9/2007 | Ferlitsch |
| 7,289,981 B2 | 10/2007 | Chang |
| 7,290,698 B2 | 11/2007 | Poslinski et al. |
| 7,293,228 B1 | 11/2007 | Lessing et al. |
| 7,302,649 B2 | 11/2007 | Ohnishi |
| 7,318,196 B2 | 1/2008 | Crow et al. |
| 7,334,191 B1 | 2/2008 | Sivan |
| 7,346,600 B2 | 3/2008 | Nakao |
| 7,346,850 B2 | 3/2008 | Swartz |
| 7,350,157 B1 | 3/2008 | Billmaier |
| 7,353,461 B2 | 4/2008 | Davidsson |
| 7,380,260 B1 | 5/2008 | Billmaier |
| 7,418,674 B2 | 8/2008 | Robbins |
| 7,444,598 B2 | 10/2008 | Horvitz |
| 7,447,713 B1 | 11/2008 | Berkheimer |
| 7,448,950 B2 | 11/2008 | Matsumoto |
| 7,458,033 B2 | 11/2008 | Bacigalupi et al. |
| 7,502,819 B2 | 3/2009 | Alonso |
| D589,972 S | 4/2009 | Casagrande et al. |
| 7,594,246 B1 | 9/2009 | Billmaier |
| 7,606,819 B2 | 10/2009 | Audet |
| 7,607,104 B2 | 10/2009 | Maeda |
| 7,629,527 B2 | 12/2009 | Hiner |
| 7,650,569 B1 | 1/2010 | Allen |
| 7,661,075 B2 | 2/2010 | Lahdesmaki |
| 7,680,817 B2 | 3/2010 | Audet |
| 7,681,128 B2 | 3/2010 | Yamamoto |
| 7,681,149 B2 | 3/2010 | Lahdesmaki |
| D614,197 S | 4/2010 | Casagrande |
| 7,703,040 B2 | 4/2010 | Cutrell |
| 7,710,423 B2 | 5/2010 | Drucker et al. |
| 7,735,102 B1 | 6/2010 | Billmaier |
| 7,757,253 B2 | 7/2010 | Rappaport |
| 7,761,471 B1 | 7/2010 | Lee |
| 7,765,184 B2 | 7/2010 | Makela |
| 7,765,195 B2 | 7/2010 | Miller |
| 7,770,117 B1 | 8/2010 | Uy |
| 7,788,247 B2 | 8/2010 | Wang |
| 7,788,592 B2 | 8/2010 | William |
| 7,792,328 B2 | 9/2010 | Albertson et al. |
| 7,818,378 B2 | 10/2010 | Buchheit et al. |
| 7,822,735 B2 | 10/2010 | Suda |
| 7,844,074 B2 | 11/2010 | Moskowitz et al. |
| 7,870,489 B2 | 1/2011 | Serita |
| 7,899,818 B2 | 3/2011 | Stonehocker |
| 7,902,741 B2 | 3/2011 | Iwanaga |
| 7,962,522 B2 * | 6/2011 | Norris, III ............ G06F 3/0482 707/792 |
| 7,991,720 B2 | 8/2011 | Mander |
| 8,001,481 B2 | 8/2011 | Chakra et al. |
| 8,010,508 B2 | 8/2011 | Audet |
| 8,010,892 B2 | 8/2011 | Audet |
| 8,069,404 B2 | 11/2011 | Audet |
| 8,078,966 B2 | 12/2011 | Audet |
| 8,099,680 B1 | 1/2012 | Kolde |
| 8,136,030 B2 | 3/2012 | Audet |
| 8,151,185 B2 | 4/2012 | Audet |
| 8,438,188 B2 * | 5/2013 | Norris, III ............ G06F 3/0482 707/792 |
| 9,081,498 B2 | 7/2015 | Thorsander et al. |
| 2001/0025288 A1 | 9/2001 | Yanase |
| 2001/0034766 A1 | 10/2001 | Morimoto |
| 2001/0055017 A1 | 12/2001 | Ording |
| 2002/0033848 A1 | 3/2002 | Sclammarella |
| 2002/0035563 A1 | 3/2002 | Suda |
| 2002/0056129 A1 | 5/2002 | Blackketter |
| 2002/0059215 A1 | 5/2002 | Kotani et al. |
| 2002/0070958 A1 | 6/2002 | Yeo |
| 2002/0078440 A1 | 6/2002 | Feinberg |
| 2002/0087530 A1 | 7/2002 | Smith |
| 2002/0096831 A1 | 7/2002 | Nakayama |
| 2002/0101458 A1 | 8/2002 | SanGiovanni |
| 2002/0152474 A1 | 10/2002 | Dudkiewicz |
| 2002/0180795 A1 | 12/2002 | Wright et al. |
| 2003/0001898 A1 | 1/2003 | Bernhardson |
| 2003/0001901 A1 | 1/2003 | Crinon et al. |
| 2003/0037051 A1 | 2/2003 | Gruenwald |
| 2003/0046693 A1 | 3/2003 | Billmaier |
| 2003/0046694 A1 | 3/2003 | Istvan |
| 2003/0046695 A1 | 3/2003 | Billmaier |
| 2003/0052900 A1 | 3/2003 | Card |
| 2003/0090524 A1 | 5/2003 | Segerberg |
| 2003/0093260 A1 | 5/2003 | Dagtas |
| 2003/0093792 A1 | 5/2003 | Labeeb |
| 2003/0120681 A1 | 6/2003 | Baclawski |
| 2003/0120737 A1 | 6/2003 | Lytle |
| 2003/0121055 A1 | 6/2003 | Kaminski et al. |
| 2003/0128228 A1 | 7/2003 | Crow et al. |
| 2003/0132971 A1 | 7/2003 | Billmaier |
| 2003/0149939 A1 | 8/2003 | Hubel |
| 2003/0163468 A1 | 8/2003 | Freeman |
| 2003/0167902 A1 | 9/2003 | Hiner |
| 2003/0190950 A1 | 10/2003 | Matsumoto |
| 2003/0237047 A1 | 12/2003 | Borson |
| 2004/0003398 A1 | 1/2004 | Donian et al. |
| 2004/0024738 A1 | 2/2004 | Yamane |
| 2004/0054968 A1 | 3/2004 | Savage |
| 2004/0064473 A1 | 4/2004 | Thomas |
| 2004/0090439 A1 | 5/2004 | Dillner |
| 2004/0111401 A1 | 6/2004 | Chang |
| 2004/0125143 A1 | 7/2004 | Deaton |
| 2004/0128277 A1 | 7/2004 | Mander |
| 2004/0128377 A1 | 7/2004 | Sadaghiany |
| 2004/0139143 A1 | 7/2004 | Canakapalli |
| 2004/0150657 A1 | 8/2004 | Wittenburg |
| 2004/0233238 A1 | 11/2004 | Lahdesmaki |
| 2004/0233239 A1 | 11/2004 | Lahdesmaki |
| 2004/0263519 A1 | 12/2004 | Andrews |
| 2005/0060667 A1 | 3/2005 | Robbins |
| 2005/0119936 A1 | 6/2005 | Buchanan et al. |

(56) References Cited

U.S. PATENT DOCUMENTS

| | | |
|---|---|---|
| 2006/0013554 A1 | 1/2006 | Poslinski et al. |
| 2006/0013555 A1 | 1/2006 | Poslinski et al. |
| 2006/0013556 A1 | 1/2006 | Poslinski et al. |
| 2006/0013557 A1 | 1/2006 | Poslinski et al. |
| 2006/0020966 A1 | 1/2006 | Poslinski et al. |
| 2006/0020971 A1 | 1/2006 | Poslinski et al. |
| 2006/0045470 A1 | 3/2006 | Poslinski et al. |
| 2006/0107096 A1* | 5/2006 | Findleton ............ G06F 11/1076 714/6.32 |
| 2006/0136466 A1 | 6/2006 | Weiner |
| 2006/0209069 A1 | 9/2006 | Bacigalupi et al. |
| 2006/0242178 A1 | 10/2006 | Butterfield |
| 2006/0248129 A1 | 11/2006 | Carnes |
| 2006/0259511 A1 | 11/2006 | Boerries |
| 2007/0005576 A1 | 1/2007 | Cutrell |
| 2007/0007884 A1 | 1/2007 | Iwanaga |
| 2007/0061855 A1 | 3/2007 | Serita |
| 2007/0067290 A1 | 3/2007 | Makela |
| 2007/0083527 A1 | 4/2007 | Wadler et al. |
| 2007/0143803 A1 | 6/2007 | Lim et al. |
| 2007/0156654 A1 | 7/2007 | Ravinarayanan |
| 2007/0168877 A1 | 7/2007 | Jain et al. |
| 2007/0171224 A1 | 7/2007 | MacPherson |
| 2007/0204218 A1 | 8/2007 | Weber |
| 2007/0214169 A1 | 9/2007 | Audet |
| 2007/0216694 A1 | 9/2007 | Audet |
| 2007/0220209 A1 | 9/2007 | Maeda et al. |
| 2007/0239676 A1 | 10/2007 | Stonehocker |
| 2007/0271508 A1 | 11/2007 | Audet |
| 2008/0000126 A1 | 1/2008 | Teza |
| 2008/0016142 A1 | 1/2008 | Schneider |
| 2008/0019371 A1 | 1/2008 | Anschutz |
| 2008/0022199 A1 | 1/2008 | Sako |
| 2008/0058106 A1 | 3/2008 | Audet |
| 2008/0071822 A1 | 3/2008 | Audet |
| 2008/0072169 A1 | 3/2008 | Audet |
| 2008/0092038 A1 | 4/2008 | Audet |
| 2008/0098323 A1 | 4/2008 | Vallone et al. |
| 2008/0104534 A1 | 5/2008 | Park et al. |
| 2008/0118219 A1 | 5/2008 | Chang et al. |
| 2008/0133579 A1 | 6/2008 | Lim |
| 2008/0134013 A1 | 6/2008 | Audet |
| 2008/0134022 A1 | 6/2008 | Audet |
| 2008/0140448 A1* | 6/2008 | Hernandez et al. ............... 705/2 |
| 2008/0141115 A1 | 6/2008 | Audet |
| 2008/0243778 A1 | 10/2008 | Behnen |
| 2008/0244437 A1 | 10/2008 | Fischer et al. |
| 2008/0256473 A1 | 10/2008 | Chakra et al. |
| 2008/0256474 A1 | 10/2008 | Chakra et al. |
| 2008/0270361 A1 | 10/2008 | Meyer |
| 2008/0270928 A1 | 10/2008 | Chakra et al. |
| 2008/0295016 A1 | 11/2008 | Audet |
| 2008/0299989 A1 | 12/2008 | King |
| 2008/0307348 A1 | 12/2008 | Jones et al. |
| 2009/0019371 A1 | 1/2009 | Audet |
| 2009/0048981 A1 | 2/2009 | Millan |
| 2009/0055413 A1 | 2/2009 | Audet |
| 2009/0055726 A1 | 2/2009 | Audet |
| 2009/0055729 A1 | 2/2009 | Audet |
| 2009/0055763 A1 | 2/2009 | Audet |
| 2009/0055776 A1 | 2/2009 | Audet |
| 2009/0063552 A1 | 3/2009 | Jones |
| 2009/0064143 A1 | 3/2009 | Bhogal et al. |
| 2009/0070662 A1 | 3/2009 | Audet |
| 2009/0070699 A1 | 3/2009 | Birkill et al. |
| 2009/0083260 A1 | 3/2009 | Artom |
| 2009/0083859 A1 | 3/2009 | Roth et al. |
| 2009/0106684 A1 | 4/2009 | Chakra et al. |
| 2009/0111434 A1 | 4/2009 | Care et al. |
| 2009/0113334 A1 | 4/2009 | Chakra et al. |
| 2009/0116817 A1 | 5/2009 | Kim et al. |
| 2009/0150832 A1 | 6/2009 | Keller et al. |
| 2009/0164933 A1 | 6/2009 | Pederson et al. |
| 2009/0199119 A1 | 8/2009 | Park et al. |
| 2009/0228788 A1 | 9/2009 | Audet |
| 2009/0235194 A1 | 9/2009 | Arndt et al. |
| 2009/0254850 A1 | 10/2009 | Almeida |
| 2009/0284658 A1 | 11/2009 | Cho |
| 2009/0287693 A1 | 11/2009 | Audet |
| 2009/0288006 A1 | 11/2009 | Audet |
| 2009/0319933 A1 | 12/2009 | Zaika et al. |
| 2010/0057576 A1 | 3/2010 | Brodersen et al. |
| 2010/0082427 A1 | 4/2010 | Burgener |
| 2010/0082653 A1 | 4/2010 | Nair |
| 2010/0083159 A1 | 4/2010 | Mountain et al. |
| 2010/0094890 A1 | 4/2010 | Bokor |
| 2010/0145976 A1 | 6/2010 | Higgins |
| 2010/0150522 A1 | 6/2010 | Schmehl et al. |
| 2010/0169823 A1 | 7/2010 | Audet |
| 2010/0171861 A1 | 7/2010 | Ota et al. |
| 2010/0185509 A1 | 7/2010 | Higgins |
| 2010/0313158 A1 | 12/2010 | Lee et al. |
| 2010/0313159 A1 | 12/2010 | Decker et al. |
| 2010/0318200 A1 | 12/2010 | Foslien et al. |
| 2010/0325132 A1 | 12/2010 | Liu |
| 2010/0325134 A1 | 12/2010 | Galfond |
| 2010/0332512 A1 | 12/2010 | Shpits |
| 2010/0333031 A1 | 12/2010 | Castelli |
| 2011/0061082 A1 | 3/2011 | Heo et al. |
| 2011/0078166 A1 | 3/2011 | Oliver |
| 2011/0145745 A1 | 6/2011 | Hyeon et al. |
| 2011/0154213 A1 | 6/2011 | Wheatley et al. |
| 2011/0246926 A1 | 10/2011 | Newton |
| 2011/0307814 A1 | 12/2011 | Audet |
| 2012/0159320 A1 | 6/2012 | Audet |
| 2012/0198385 A1 | 8/2012 | Audet |
| 2012/0198389 A1 | 8/2012 | Audet |
| 2012/0249581 A1 | 10/2012 | Cassistat |
| 2012/0260204 A1 | 10/2012 | Audet |
| 2013/0080880 A1 | 3/2013 | Cassistat |
| 2013/0080888 A1 | 3/2013 | Audet |
| 2013/0198782 A1* | 8/2013 | Arruda ............... H04N 21/4821 725/52 |
| 2014/0244625 A1* | 8/2014 | Seghezzi ........... G06F 17/30554 707/722 |

FOREIGN PATENT DOCUMENTS

| | | |
|---|---|---|
| JP | 08-016612 | 1/1996 |
| JP | 09-016809 | 1/1997 |
| JP | 09-265480 | 10/1997 |
| JP | 09-288659 | 11/1997 |
| JP | 10-143414 | 5/1998 |
| JP | 10-149432 | 6/1998 |
| JP | 10-275222 | 10/1998 |
| JP | 11-120180 | 4/1999 |
| JP | 11-195028 | 7/1999 |
| JP | 11-212988 | 8/1999 |
| JP | 2000-099540 | 4/2000 |
| JP | 2000-250942 | 9/2000 |
| JP | 2000-293281 | 10/2000 |
| JP | 2000-348040 | 12/2000 |
| JP | 2001-005822 | 1/2001 |
| JP | 2001-092737 | 4/2001 |
| JP | 2001-101227 | 4/2001 |
| JP | 2001-167288 | 6/2001 |
| JP | 2001-243244 | 9/2001 |
| JP | 2001-282816 | 10/2001 |
| JP | 2001-331514 | 11/2001 |
| JP | 2001-337762 | 12/2001 |
| JP | 2001-337953 | 12/2001 |
| JP | 2002-056411 | 2/2002 |
| WO | WO 00/65429 | 11/2000 |
| WO | WO 01/22194 | 3/2001 |
| WO | WO 01/63378 | 8/2001 |
| WO | WO 01/98881 | 12/2001 |
| WO | WO 03/001345 | 1/2003 |
| WO | WO 03/032199 | 4/2003 |
| WO | WO 2005/045756 | 5/2005 |
| WO | WO 2005/083595 | 9/2005 |
| WO | WO 2007/095997 | 8/2007 |
| WO | WO 2008/030779 | 3/2008 |

* cited by examiner

Fig. 8

| WF # | Responsible | Date | Description | Status |
|---|---|---|---|---|
| 1 | Francois | 2010-01-01 | Doc. Preparation | Doc. Preparation |
| 2 | Francois | 2010-02-01 | Doc. Filing | Doc. Filing |
| 3 | Francois | 2010-02-15 | E-Filing Receipt | E-Filing Receipt |
| 4 | Francois | 2010-03-01 | Receiving Receipt | Receiving Receipt |
| 5 | Lisa P. | 2010-03-15 | Prep. Assignment | Prep. Assignment |
| 6 | Lisa P. | 2010-03-16 | Filing Assignment | Filing Assignment |
| 7 | Lisa P. | 2010-03-17 | Received Notice Rec. | Received Notice Rec. |
| 8 | Roger | 2010-03-18 9:42 AM | Sending Client Conf. | Sending Client Conf. |
| 9 | Roger | 2010-03-18 1:23 PM | Client Acknowledged | Client Acknowledged |

Fig. 9

| WF # | Responsible | Date | Description | Status |
|---|---|---|---|---|
| 1 | Francois | 2010-01-01 | Doc. Preparation | Doc. Preparation |
| 2 | Francois | 2010-02-01 | Doc. Filing | Doc. Filing |
| 3 | Francois | 2010-02-15 | E-Filing Receipt | E-Filing Received |
| 4 | Francois | 2010-03-01 | Receiving Receipt | Receiving Receipt |
| 5 | Lisa P. | 2010-03-15 | Prep. Assignment | Prep. Assignment |
| 6 | Lisa P. | 2010-03-16 | Filing Assignment | Filing Assignment |
| 7 | Lisa P. | 2010-03-17 | Received Notice Rec. | Received Notice Rec. |
| 8 | Roger | 2010-03-18 9:42 AM | Sending Client Conf. | Sending Client Conf. |
| 9 | Roger | 2010-03-18 1:23 PM | Client Acknowledged | Client Acknowledged |

Fig. 10

| WF # | Responsible | Date | Description | Status |
|---|---|---|---|---|
| 1 | Francois | 2010-01-01 | Doc. Preparation | Doc. Preparation |
| 2 | Francois | 2010-02-01 | Doc. Filing | Doc. Filing |
| 3 | Francois | 2010-02-15 | E-Filing Receipt | E-Filing Received |
| D 200 | D 200 | D 200 | D 200 | D 200 D 200 D 200 D 200 D D 200 D 200 |
| 4 | Francois | 2010-03-01 | Receiving Receipt | Receiving Receipt |
| 5 | Lisa P. | 2010-03-15 | Prep. Assignment | Prep. Assignment |
| 6 | Lisa P. | 2010-03-16 | Filing Assignment | Filing Assignment |
| 7 | Lisa P. | 2010-03-17 | Received Notice Rec. | Received Notice Rec. |
| 8 | Roger | 2010-03-18 9:42 AM | Sending Client Conf. | Sending Client Conf. |
| 9 | Roger | 2010-03-18 1:23 PM | Client Acknowledged | Client Acknowledged |

MULTI-FUNCTIONS AXIS-BASED INTERFACE

CROSS-REFERENCES

The present application is a nonprovisional of, and claims priority under 35 U.S.C. 119(e) to, U.S. provisional patent application No. 61/658,619, filed Jun. 11, 2012, entitled METHOD AND SYSTEM FOR DISPLAYING, USING ND SHARING DATA ON AXES, which is incorporated herein by reference in their entireties. Any publication of and any patent issuing from the foregoing U.S. patent applications is hereby incorporated herein by reference. Furthermore, the disclosure of the priority provisional application is contained in the Appendix hereto, which is incorporated herein by reference.

BACKGROUND OF THE INVENTION

1. Field of the Invention

This invention relates generally to computer systems adapted to manage information elements disposed on arrays and axes thereof in conjunction with another data representation element. The present invention more specifically relates to methods and apparatuses for displaying, organizing and navigating among information elements disposed in arrays and axes thereof in conjunction with a means to access and use the arrays and axes.

2. Description of the Related Art

Projects are generating documents and these documents should be managed in the most efficient way possible. Ordering and classifying documents in a classification structure takes significant time and can be complex. A likelihood of confusion remains present as how the classification structure is going to be interpreted by each person classifying the documents. Despite the improvement of computers having sensitive documents ordered in a comprehensive fashion remains a challenge.

Projects have a significant number of documents associated therewith. A project can be divided into different phases or the like. Some projects can follow a precise workflow further detailing steps of the project. For instance, a workflow can include various interactions of phases, events, tasks, notes, bring forward (BF), among others. This more detailed type of project document management increases the level of complexity for a user.

Graphical user interfaces (GUIs) are becoming more and more graphically rich in displaying documents, icons and other information elements. Today's lists of documents are turning progressively into highly graphical sequences of documents from which users can attain greater meaning and purpose than before. This is due primarily to the fact that modern GUIs display graphically complex thumbnails, icons and file previews; large number of documents and highly customized ordering of sequences in which the objects displayed are presented.

A sequence of documents may be presented in arrays of various forms, such as an axis, a group of axes or a matrix. In a related fashion, an axis or an array can contain documents that display various degrees of relevance to a user based on the attributes associated with each document or group thereof. Documents, in general, can be unevenly distributed in an array in dependence of the manner in which they are initially organized in the respective array. Finding the documents, from an array, that are deemed relevant by the user may, therefore, be difficult or even confusing when few or no relevant documents appear in the display area.

It is therefore desirable to provide proper indications and means adapted for the navigation of an array of documents in relation with a predetermined classification structure or workflow process over the existing art. It is also desirable to indicate to a user, which part of an array relates to which portion of a classification structure or workflow. It is equally desirable to display an array, an axis or a portion thereof, in graphical relationship a specific classification structure or with respective steps of a workflow.

It is also desirable to provide indications and means for efficiently navigating an axis, row or column of an array of documents in relationship with steps of a workflow. It is also desirable to provide an improved method for simultaneously navigating steps of a workflow process (or workflow entries) and documents corresponding to respective steps of the workflow process.

It is yet also desirable to provide a method and system adapted to find and navigate documents deemed relevant to a portion of a workflow by a user when such documents are located on an axis, row or column of a display.

It is desirable to provide a means to simply categorize documents and retrieve categorized documents with a unified interaction element.

It is also desirable to categorize documents by an interaction between documents with a categorization element representing a preformatted categorization where the documents are going to acquire the categorization of the categorization element.

Other deficiencies will become apparent to one skilled in the art to which the invention pertains in view of the following summary and detailed description with its appended figures.

SUMMARY OF THE INVENTION

One aspect of the present invention is to alleviate one or more of the shortcomings of the background art by addressing one or more of the existing needs in the art.

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

At least a portion of the invention is generally described as a method, a system, a device and/or a graphical user interface used to represent multiple computer files, documents, or other data on axes in an axis-based graphical user interface (GUI).

Aspects of our work provide a method and system allowing a user to efficiently navigate arrays of documents, or a portion thereof, in conjunction with a predetermined workflow.

At least one aspect of our work, and according to at least one embodiment thereof, an interaction element is used to classify documents and retrieve classified documents in simple fashion. The interaction element can be embodied as a status bar, menu bar, identification of parts of a workflow process, docket entries, steps of a workflow process and the like. The interaction element can be used for locating an axis therefrom, extending therefrom and providing information regarding the nature of the displayed documents along an axis.

One aspect of the instant invention provides, and according to at least one embodiment thereof, a method, an apparatus and a graphical user interface adapted to present arrays of documents as a single axis, row, or column or a plurality thereof, associated with a particular step of a workflow.

Moreover, one other aspect of the instant invention, and according to at least one embodiment thereof, provides a method, an apparatus and a graphical user interface adapted to present arrays of documents of various degrees of relevance to steps of a workflow.

An aspect of the instant invention, according to at least one embodiment thereof, provides a method, an apparatus and a graphical user interface adapted to display a series of steps of a workflow and wherein steps can be spaced apart to insert an axis of documents relevant to the an adjacent step of the workflow to identify which documents are related to the adjacent step.

An aspect of the instant invention, according to at least one embodiment thereof, provides a method, an apparatus and a graphical user interface adapted to display a series of steps of a workflow in a first direction and wherein steps can be spaced apart to orthogonally insert an axis of documents relevant to the an adjacent step of the workflow to identify which documents are related to the adjacent step.

In one aspect of the instant invention, according to at least one embodiment thereof, documents of many steps of a workflow are displayed along an axis of document and documents thereof relevant to a specific step of the workflow are visually discriminated from documents relevant to other steps of the workflow.

Another aspect of the present invention, according to at least one embodiment thereof, provides a mechanism adapted to display documents associated with a workflow on the axis, row or column that is parallelly or perpendicularly displayed in respect with an axis representing a series of steps in a workflow.

Another aspect of the present invention, according to at least one embodiment thereof, provides a mechanism adapted to allow further discrimination among documents related to a particular step of a workflow, discrimination being made, for instance, on a basis of attributes and being graphically reflected through, for example, the application of visually distinctive features applied to documents or dividing of relevant documents among more than one axis related to a specific step of a workflow process.

A further aspect of the instant invention, according to at least one embodiment thereof, provides a mechanism adapted to locate documents related to a workflow in relation with a collation function; a preferred but not restrictive collation function being a chronological ordering.

In another aspect of the instant invention, according to at least one embodiment thereof, a feature is provided for systematically associating documents relevant to each docket entry of a legal matter.

In one other aspect of the present invention, according to at least one embodiment thereof, a mechanism is provided adapted to move the axis of documents directly to a document thereon relevant to a specific step of a workflow when the step of a workflow if selected.

In yet another aspect of the instant invention, according to at least one embodiment thereof, a method is provided for indicating to a user the presence, the number and location of documents deemed relevant in a step of a workflow when the documents contained in an array of documents bear a plurality of attributes possibly designating a plurality of steps of a workflow.

In one other aspect of the invention, according to at least one embodiment thereof, a mechanism is provided to enable filtered navigational capability to documents associated with a workflow at specific and predetermined positions within an array of documents according to a query specifying a portion of the workflow for relevance.

In another aspect of the invention, according to at least one embodiment thereof, a mechanism is provided to enable direct navigation of an axis, row, column or group of axes to associated steps of a workflow.

In one aspect of the instant invention, according to at least one embodiment thereof, a mechanism is provided for changing axes of documents relevant to distinct steps of a workflow upon selection of a step. Graphical identifications of steps can be spaced apart to allow display of the relevant axis.

In one other aspect of the instant invention, according to at least one embodiment thereof, a mechanism is provided to reach and display documents relevant to a specific step of a workflow that are located at a specific and predetermined location of an axis, row, or column that might not be readily visible.

Embodiments of the subject invention can be embodied as a computer system, a method, an operating system and a graphical user interface adapted to manage data and documents by juxtaposing the data on axes of documents in a manner such that data, documents and axes thereof are parametrizable and usable by a plurality of users and can be displayed according to a selection of a step of a workflow, metadata or attributes as deemed relevant by user or users in a single-user or networked environment.

Another aspect of our work provides, according to at least one embodiment thereof, an object-oriented computing system. The computing system comprises a processor, a memory coupled to the processor, and an interface. The computer system comprises a computer-readable storage medium storing instructions, such as a software program adapted to carry out the embodiments. The instructions that, when executed, provide a processor-based system the steps to modify the type and quantity of information used to build and display a document, axis, group of axes and/or workspace on a variety of devices including but not limited to computers, mobiles phones or tablets.

In another aspect of our work, a graphical user interface is provided. The graphical user interface displays one or more axes of documents in accordance with the implementation of a method that manages documents and the data associated therewith.

Embodiments of the present invention can have at least one of the above-mentioned objects and/or aspects, but does not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

FIG. 8 is a schematic illustration of an exemplary table of docket entries in accordance with an embodiment of at least one embodiment the present invention;

FIG. 9 is a schematic illustration of an exemplary table of docket entries in accordance with at least one embodiment the present invention;

FIG. 10 is a schematic illustration of an exemplary table of docket entries and an axis in accordance with at least one embodiment the present invention;

DESCRIPTION OF EMBODIMENT(S) OF THE INVENTION

Our work is now described with reference to the figures. In the following description, for purposes of explanation, numerous specific details are set forth in order to provide a thorough understanding of the present invention by way of embodiment(s). It may be evident, however, that the present invention may be practiced without these specific details. In other instances, when applicable, well-known structures and devices are shown in block diagram form in order to facilitate describing the present invention.

The features provided in this specification mainly but might not exclusively relate to principles of computer software and machine-readable code/instructions adapted to instruct a computer, many computers or other machines adapted to use the instructions to provide material effects on a display, or other means enabling human-computer interactions to manage documents, menus, user-selectable elements and other computer files. These code/instructions are preferably stored on a machine-readable medium to be read and acted upon with a computer or machine having the appropriate code/instructions reading capability.

Exemplary Network

Figure 1:
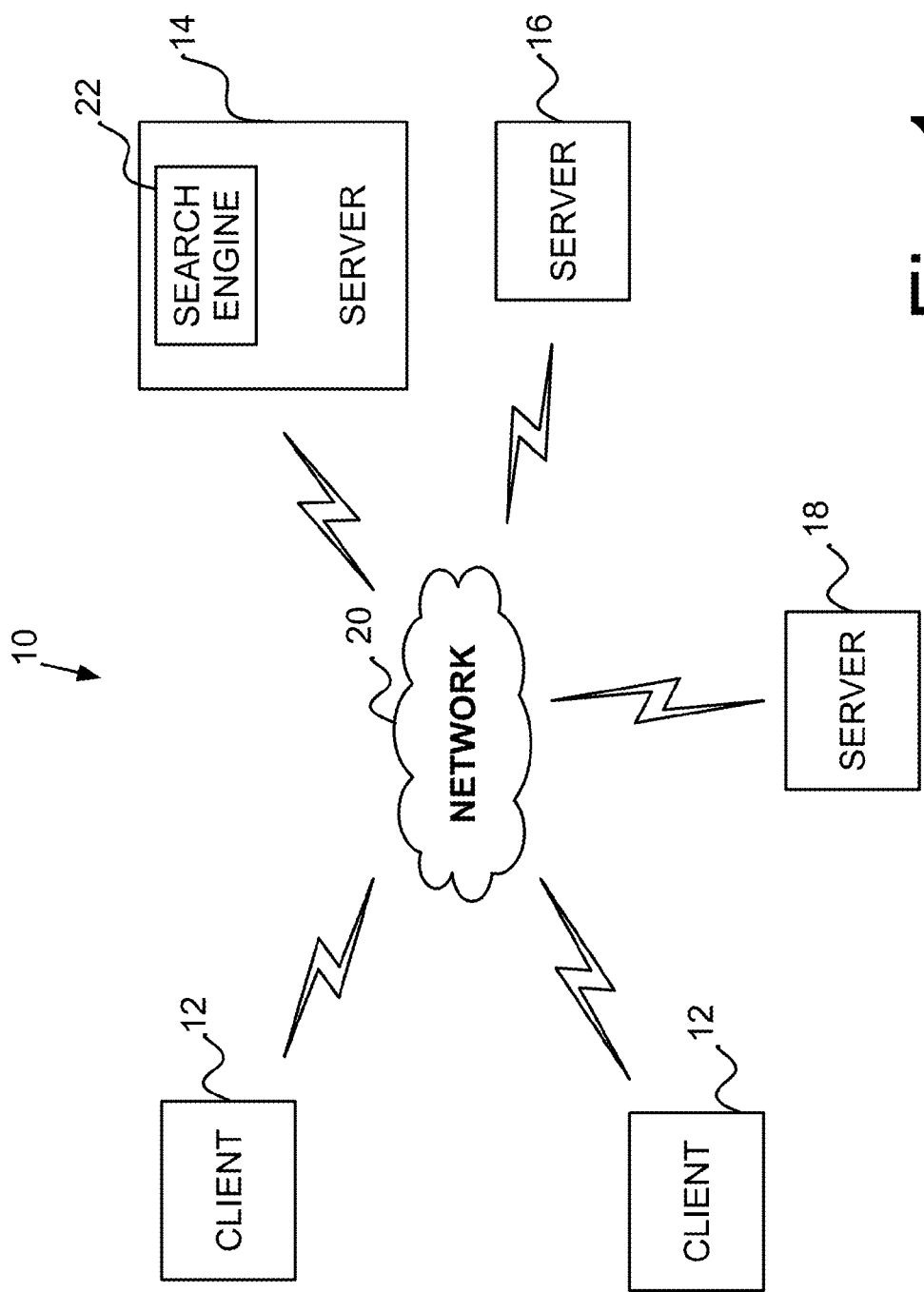
FIG. 1 is a schematic illustration of an exemplary network.

FIG. 1 illustrates an exemplary network 10 in which a system and a method, consistent with the present invention, may be implemented. The network 10 may include multiple client devices 12 connected to multiple servers 14, 16, 18 via a network 20. The network 20 may include a local area network (LAN), a wide area network (WAN), a phone network, such as the Public Switched Phone Network (PSTN), an intranet, the Internet, Wi-Fi, WiMAX or a combination thereof. Two client devices 12 and three servers 14, 16, 18 have been illustrated as connected to network 20 for simplicity. In practice, there may be more or less client devices and servers 14, 16, 18. Also, in some instances, a client 12 device may perform the functions of a server 14, 16, 18 and a server 14, 16, 18 may perform the functions of a client 12 device.

The client devices 12 may include devices such as mainframes, minicomputers, personal computers, laptops, personal digital assistants, phones, or the like, capable of connecting to the network 20. The client devices 12 may transmit data over the network 20 or receive data from the network 20 via a wired, wireless, or optical connection.

The servers 14-18 may include one or more types of computer systems, such as a mainframe, minicomputer, or personal computer, capable of connecting to the network 20 to enable servers 14-18 to communicate with the client devices 12. In alternative implementations, the servers 14-18 may include mechanisms for directly connecting to one or more client devices 12. The servers 14-18 may transmit data over the network 20 or receive data from the network 20 via a wired, wireless, or optical connection.

In an implementation consistent with the present invention illustratively embodied herein, the servers 14-18 may include a search engine 22 usable by the client devices 12. The servers 14-18 may store documents 200, such as web pages, accessible by the client devices 12.

Figure 2:
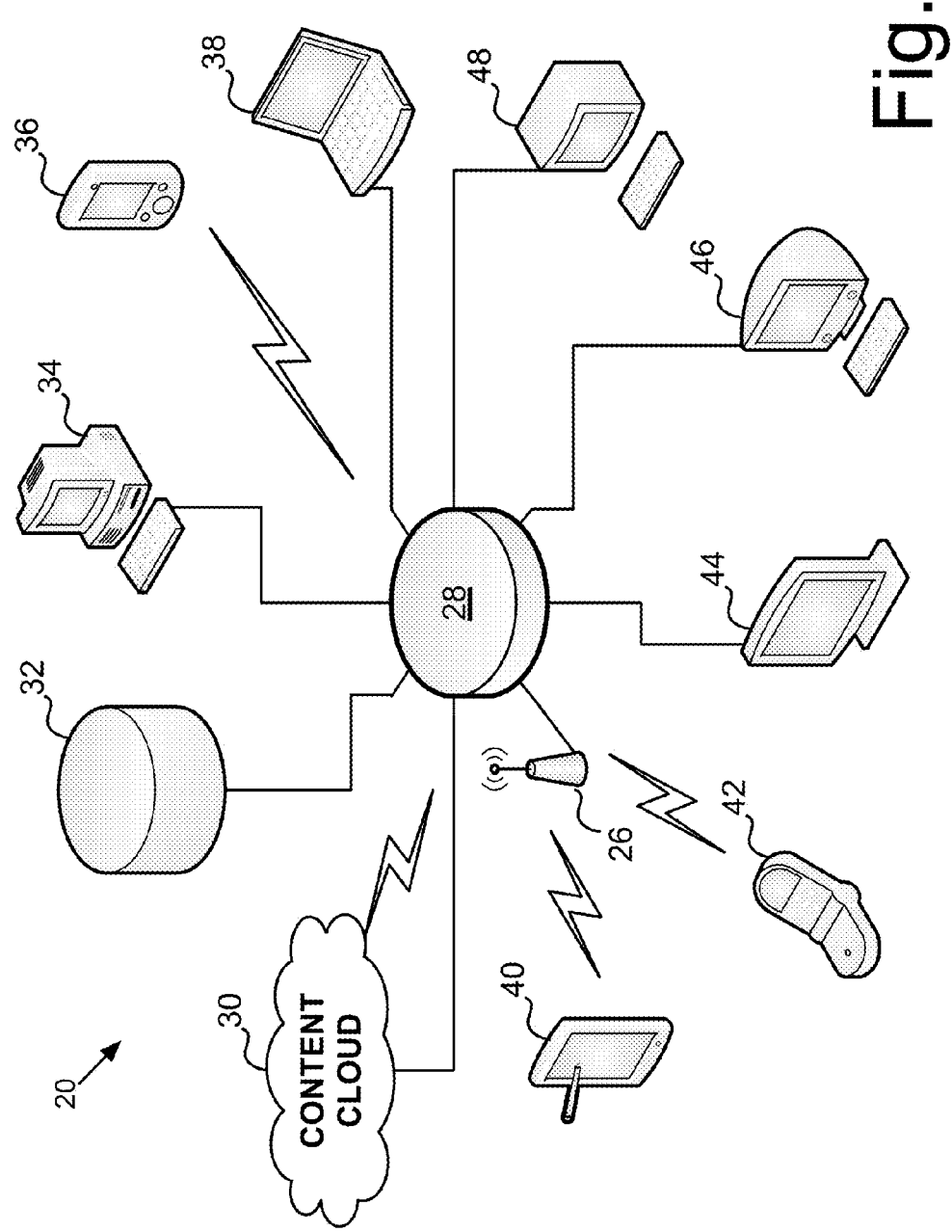
FIG. 2 is a schematic illustration of an alternate exemplary network.

With reference to FIG. 2, a network 20 includes the content cloud 30, a content database 32, content devices 34-38, and other devices 40-48. The network mediator 28 enables network devices 34-48 to communicate with each other without pre-configuring each device 34-48. The content cloud 30 represents a content source such as the Internet, where content exists at various locations across the globe that could be reached through a wired connection and/or with a wireless connection provided by an antenna 26. The content includes multimedia content such as audio and video. The mediator 28 allows the content cloud to provide content to devices 34-48. The database 32 is a storage device 166 that maintains content. The database 32 may be a standalone device on an external communication network. The mediator 28 communicates with the database 32 to access and retrieve content. The content devices 34-48 include intelligent devices, such as, for example, personal computers, laptops, cell phones and personal digital assistants. The content devices 34-48 are capable or storing content data. The devices 34-48 are intelligent devices that receive content from other content devices 30-48. However, the devices 34-48 can also operate as servers to distribute content to other client devices if desirable.

Exemplary Client Architecture

The following discussion provides a brief, general description of an exemplary computer apparatus in which at least some aspects of the present invention may be implemented. The present invention will be described in the general context of computer-executable instructions, such as program modules 174 being executed by a computerized device. However, methods of the present invention may be affected by other apparatuses. Program modules may include routines, programs, objects, components, data structures, applets, WEB 2.0 type of evolved networked centered applications, etc. that perform a task(s) or implement particular abstract data types. Moreover, those skilled in the art will appreciate that at least some aspects of the present invention may be implemented with other configurations, including hand-held devices, multiprocessor system, microprocessor-based or programmable consumer electronics, network computers, minicomputers, set top boxes, mainframe computers, gaming consoles and the like. At least some aspects of the present invention may also be carried out in distributed computing environments where tasks are performed by remote processing devices linked through a communications network as exemplified in FIG. 2. In a distributed computing environment, program modules 174 may be located in local and/or remote memory storage devices 166.

Figure 3:
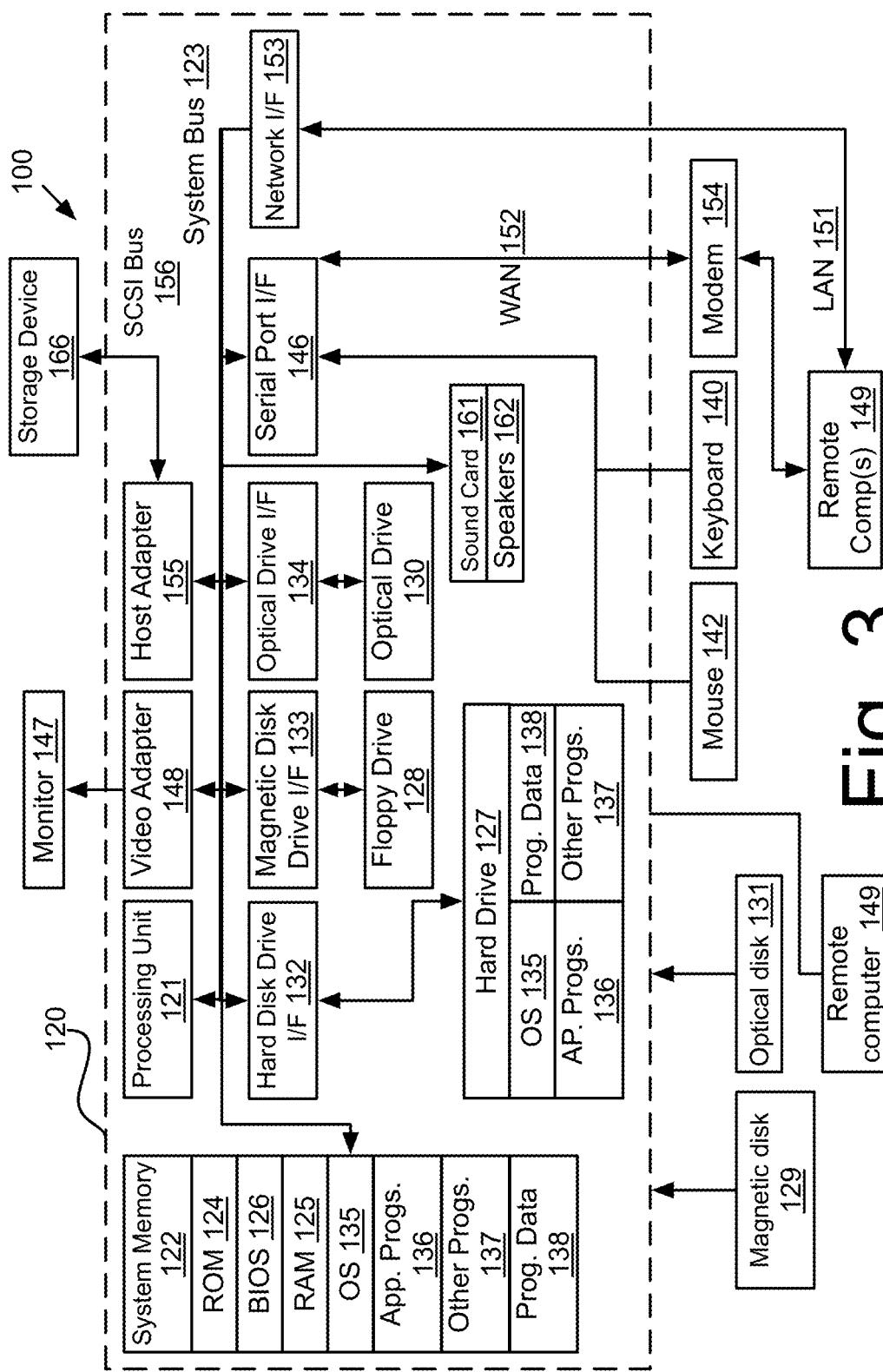
FIG. 3 is a schematic illustration of an exemplary computer system.

With reference to FIG. 3, an exemplary apparatus 100 for implementing at least some aspects of the present invention includes a general-purpose computing device in the form of a computer 120 or in the form of a computerized portable apparatus. The computer 120 may include a processing unit 121, a system memory 122, and a system bus 123 that couples various system components, including the system memory 122, to the processing unit 121. The system bus 123 may be any of several types of bus structures including a memory bus or memory controller, a peripheral bus, and a local bus using any of a variety of bus architectures. The system memory may include read only memory (ROM) 124 and/or random access memory (RAM) 125. A basic input/output system 126 (BIOS), containing basic routines that help to transfer data between elements within the computer 120, such as during start-up, may be stored in ROM 124. The computer 120 may also include a hard disk drive 127 for reading from and writing to a hard disk, (not shown), a magnetic disk drive 128 for reading from or writing to a (e.g., removable) magnetic disk 129, and an optical disk drive 130 for reading from or writing to a removable (magneto) optical disk 131 such as a compact disk or other (magneto) optical media. The hard disk drive 127, magnetic disk drive 128, and (magneto) optical disk drive 130 may be coupled with the system bus 123 by a hard disk drive interface 132, a magnetic disk drive interface 133, and a (magneto) optical drive interface 134, respectively. The drives and their associated storage media provide non-volatile (or persistent) storage of machine-readable instructions, data structures, program modules 174 and other data for the computer 120. Although the exemplary environment described herein employs a hard disk, a removable magnetic disk 129 and a removable optical disk 131, those skilled in the art will appreciate that other types of storage media, such as magnetic cassettes, flash memory cards, digital video disks, Bernoulli cartridges, random access memories (RAMs), read only memories (ROM), remote cloud storage and the like, may be used instead of, or in addition to, the storage devices 166 introduced above.

A number of program modules 174 may be stored on the hard disk 127, magnetic disk 129, (magneto) optical disk 131, ROM 124 or RAM 125, such as an operating system 135 (for example, Windows® NT™ 4.0, sold by Microsoft® Corporation of Redmond, Wash.), one or more application programs 136, other program modules 137 (such as Alice™, which is a research suite developed by the User Interface Group at Carnegie Mellon University available at www.Alice.org, OpenGL® from Silicon Graphics Inc. of Mountain View Calif., or Direct 3D from Microsoft Corp. of Bellevue Wash.), and/or program data 138 for example.

A user may enter commands and data into the computer 120 through input devices, such as a keyboard 140, a camera 141 and a pointing device 142. Other input devices (not shown) such as a microphone, joystick, game pad, satellite dish, scanner, a touch sensitive screen, accelerometers or a motion-sensor detector such as KINECT™ that are adapted to sense movements of the user or movements of a device, or the like, may also be included. These and other input devices are often connected to the processing unit 121 through a serial port interface 146 coupled to the system bus 123. However, input devices may be connected by other interfaces, such as a parallel port, a game port, blue tooth connection or a universal serial bus (USB). For example, since the bandwidth of the camera 141 may be too great for the serial port, the video camera 141 may be coupled with the system bus 123 via a video capture card (not shown). The video monitor 147 or other type of display device 150 may also be connected to the system bus 123 via an interface, such as a video adapter 148 for example. The video adapter 148 may include a graphics accelerator. One or more speakers 162 may be connected to the system bus 123 via a sound card 161 (e.g., a wave table synthesizer such as product number AWE64 Gold Card from Creative® Labs of Milpitas, Calif.). In addition to the monitor 147 and speaker(s) 162, the computer 120 may include other peripheral output devices (not shown), such as a printer, a hi-definition television and a scanner for example. As an alternative or an addition to the video monitor 147, a stereo video output device, such as a head mounted display or LCD shutter glasses for example, could be used.

The computer 120 may operate in a networked environment defining logical connections to one or more remote computers 120, such as a remote computer 149. The remote computer 149 may be another computer 120, a server 14-18, a router, a network PC, a peer device or other common network node, and may include many or all of the elements described above relative to the computer 120. The logical connections depicted in FIG. 3 include a local area network (LAN) 151 and a wide area network (WAN) 152, an intranet and the Internet.

When used in a LAN, the computer 120 may be connected to the LAN 151 through a network interface adapter (or "NIC") 153. When used in a WAN, such as the Internet, the computer 120 may include a modem 154 or other means for establishing communications over the wide area network 152 (e.g. Wi-Fi, WinMax). The modem 154, which may be internal or external, may be connected to the system bus 123 via the serial port interface 146 or another type of port interface. In a networked environment, at least some of the program modules depicted relative to the computer 120 may be stored in the remote memory storage device 166. The network connections shown are exemplary and other means of establishing a communications link between the computers 120 may be used.

The exemplary network and the exemplary computer system described above are adapted to carry on the following embodiments:

The System

Figure 4:
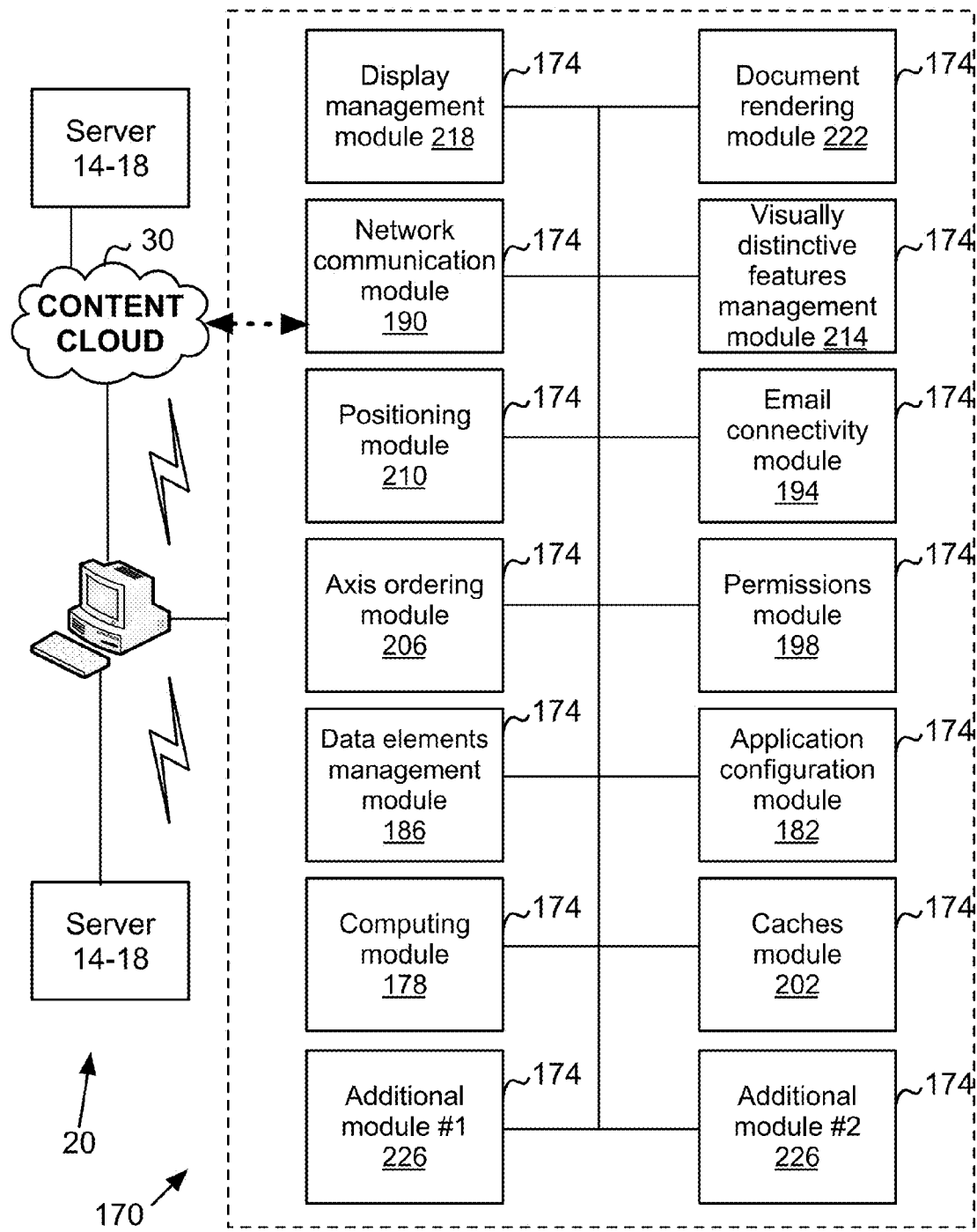
FIG. 4 is a schematic illustration of an exemplary software system.

A system 170 is depicted in FIG. 4 which may represent the functionalities described in the instant application when run on an apparatus 100, for instance a computer 120, such as has been previously described. The computer 120 may in turn be connected to a server 14-18 comprising a set of program modules 174 enabling functions including but not limited to: computing, document rendering, network communication, application configuration and local database management.

The software system 170 illustratively consists of a collection of at least twelve modules 174 independent from those of the server 14-18 that together carry out the method required for the functionalities to be visible on a graphical user interface and usable by the user. As illustrated, additional modules 226 may also be used in conjunction with the twelve base modules.

A computing module 178 provides a means to circulate data between users, the other modules 174 and the apparatus 100. The computing module 178 is adapted to convert queries 230, which may be system-based or user-based, into graphical rendering in accordance with at least one embodiment of the present invention. The other modules 174 are configured to send to and receive data from the computing module and to individually or collectively interact with other modules 174.

An application configuration module 182 provides software configuration to manage application settings and open connections to other servers 14-18. Other modules 174 may use the application configuration module 182 to manage their behavior to satisfy user-specific needs.

A data elements management module 186 may be used in conjunction with other modules to manage data elements such as documents 200 contained in a database 32 in response to a query 230. The data elements management module 186 may use any kind of database connection and may use a network communication module 190 in order to access a database 32 through a network 28, on a server computer 14-18. The network communication module 190 may use several protocols in order to communicate with a server computer 14-18, such as IPv4, IPv6, TCP, UDP, ODBC, HTTP, WebDAV, SSH, IMAP and even define its own specific communication protocol. The data elements management module 186 may also be used in conjunction with an email connectivity module 194 and network communication module 190 in order to treat and represent emails in the same way as the data elements of a database 32. The data elements management module 186 may also be used in conjunction with the permissions module 198 (on the client or server side) in order to control the user access to elements based by some sort of sharing rules. The data elements management module 186 may also work in conjunction with a caches module 202, providing client-side cached versions of the database 32 and files in order to respond to future requests faster. Modules 174 may be made to communicate information in a standardized way by the use of an Application Programming Interface (API) in order to simplify the data elements management module's 186 interactions with other modules 174.

The data elements management module 186 may sort through documents 200 stored in the database 32 and connected to each other via a variety of referencing modes, may apply a filter as specified in a query 230 and may subsequently direct the filtered documents 200 to other modules 174 (this will be shown in FIG. 6). One such module may be an axis-ordering module 206 which may distribute documents 200 filtered by the data elements management module 186 onto an axis-like array 288 or axis 292 (illustrated in FIG. 6) according to a collation function that may be user- or system-specified and analyzed by the computing module 178. An axis 292 or axis-like array 288 is an embodiment of graphical rendering of the functionalities described in the present specification on a device's display 150 that can be embodied as a substantially rectilinear sequence of documents 200 from which a viewer can infer meaning and/or relationships therebetween. An axial distribution 292 of documents 200 is adapted to accommodate and display a single type of documents 200 or, if desirable, more than one type of documents 200, computer files, multimedia contents, user-selectable elements and/or user-selectable menu elements. Generally, an axis 292 is used to graphically group information elements 200 having a commonality. Other functionalities related to axes 292 shall be described in greater detail below.

The axis-ordering module 206 may manage the ordering of single documents 200 and/or several documents 200 assembled into document sets 220 onto one or more axes 292. In addition of managing the collation of documents 200 onto an axis 292, the axis-ordering module 206 may also manage the order of the documents 200 contained within secondary documents sets 232 (not illustrated). The positioning module 210 manages the positioning of documents 200 within axes 240 based on interactions with other modules 174 processing the various elements contained in a query 230. The positioning module 210 is adapted to and may interpret data contained in document sets 228 generated by the data elements management module 186 in relationship to the query 230 to identify a location for a given document set 228 within the collation of an axis 292. Likewise, a visually distinctive features management module 214 is adapted to interpret data contained in documents 200 or document sets 228 generated by the data elements management module 186 in relationship to the query 230 to selectively apply one or more visually distinctive features 284 (not illustrated in this figure) to single documents 200 or document sets 228. Finally, a display management module 218 may, inter alia, manage elements related to the user interface 234, possibly interacting with a graphics card and a monitor 147. The display management module 218 may use a document-rendering module 222 that provides instructions to render specific documents 200, like images, text files, word-processing files, spreadsheet files, presentation files, etc. The document-rendering module 222 may also provide an API to let developers add their own extensions to deliver to renderers other document types.

Figure 5:
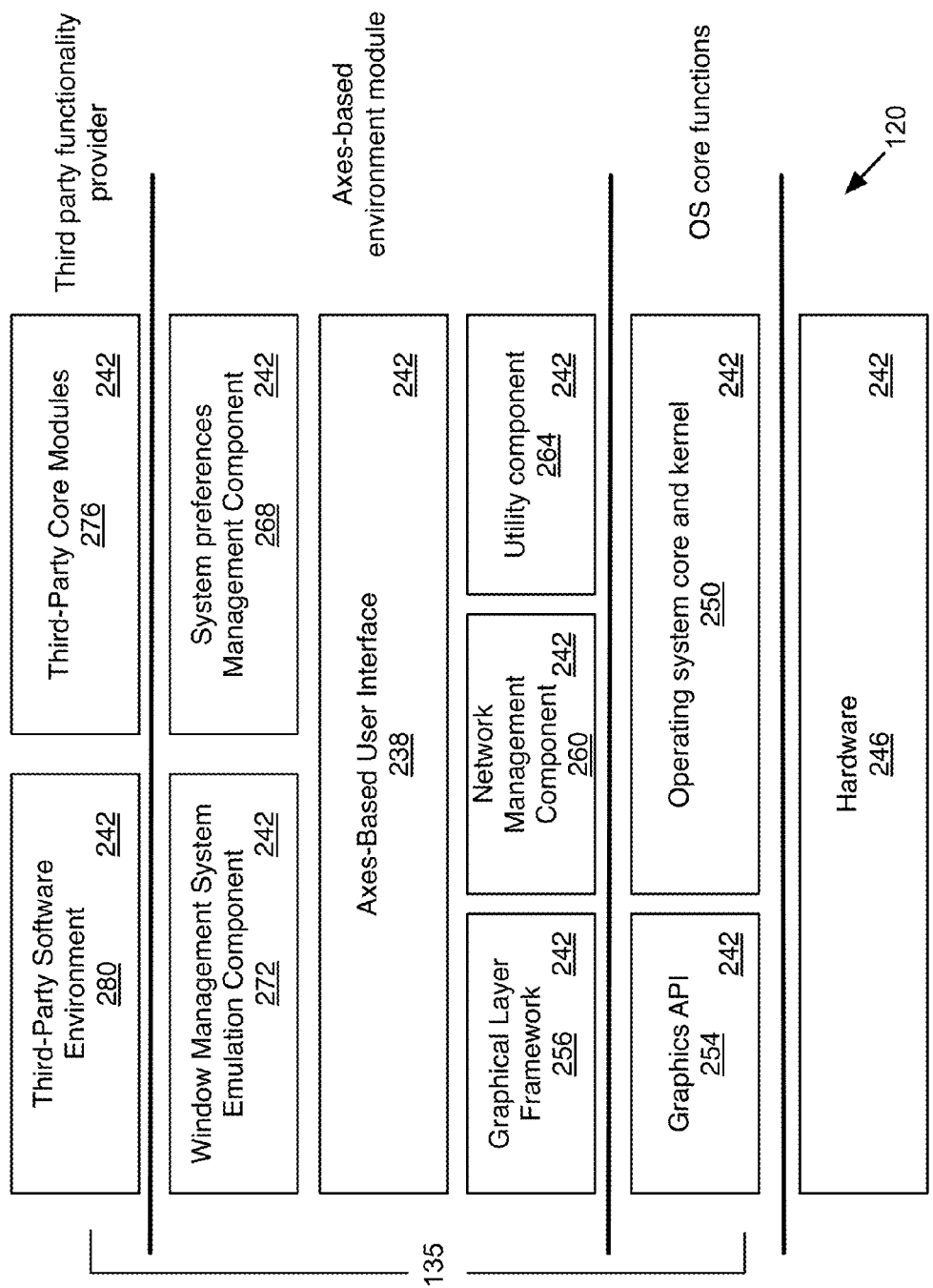
FIG. 5 is a schematic illustration of an axis-based interface and operating system.

FIG. 5 depicts a computer system 120 comprising an operating system 135 with an integrated axis-based user interface 238. As illustrated in FIG. 5, the axis-based user interface 238 could serve as a desktop environment to manipulate documents 200 (such as files, objects and applications), or could be used as a main operating system 135 user interface 234. One can appreciate a hierarchical description of a computer system 120 and software system 170 with multiple components 242. First, hardware 246 is used to provide users with a physical device 34-48. Second, the axis-based system could be built on top of an existing operating system core and kernel 250, such as, for instance, Unix™ or BSD™. A graphics API 254 like OpenGL® could also be used in order to provide basic graphical capabilities to the system via a video adapter 148.

Multiple core functionalities could be integrated to provide core operating system 135 services. A graphical layer framework component 256 could be built over the graphics API component 254, and could be used to provide complex drawing capabilities. The layer-based graphics layer framework component 256 may also support widget rendering and handling (like buttons, text fields, dialogs, etc.) A network management component 260 could be based on pre-existing network management capabilities in the operating system core and kernel 250. It could serve as a tool to manage an Internet network connection through Ethernet, Bluetooth, Wi-Fi, Modem and other communication channels. A utility component 264 could handle all the other services needed to communicate with the operating system core and kernel 250, providing functionalities such as user login, user authentication, memory, disk-access management, etc. Using these modules, the axis-based user interface 238 would use core functionalities from the graphical layer framework component 256, the network management component 260 and the utility component 264 to provide workspaces 306 comprising multiple axes 292 that display documents 200 (not shown in FIG. 5). The axis-based user interface 238 may also provide more integrated actions, like interface buttons, preview or magnification that may be directly docketed. Another component, a system preferences management component 268 would provide multiple functions needed by the axis-based user interface 238, such as dialogs to manage document insertion, attribute definitions, users, permissions, application configuration, etc. Finally, the operating system 135 may comprise a window management system emulation module 272. This module may be based on an X Window System or X11© and may use other existing client application libraries to provide a large number of applications as well as functionalities to run windowed applications on top of the axis-based user interface 238. To provide other functionalities, third-party application providers could build third-party core modules 276 on top of the axis-based user interface 238 and system preferences management module 268. Third-party application providers could also develop third-party software environments 280 and other applications that could be run using the window management system emulation 272, providing the user with useful applications such as an Internet Browser, Office Business Applications, Multimedia Applications, Games, etc.

The Window Management System Emulation 272 could also offer functions to provide a more axis-based user interface 238 integration, such as, previews, player and editors for the documents 200 displayed in the axis-based user interface 238. For example, a rich text document 200 could use a third-party module 276 or third-party software environment 280 to provide a previewer or media player for the document 200, or a third-party application to integrate a live editor on the axis-based user interface 238.

This computer system 120 could be used, for instance, as a business solution to provide users with an axis-based user interface 238 operating system 135 directly on multiple kinds of devices 34-48 (computers, laptop, tablets, cell phones, etc.). The computer system 120 may also illustratively be used as a business solution to sell preconfigured devices 34-48 with the axis-based user interface 284. Since the operating system 135 has a built-in axis-based user interface 284, the device 34-48 is likely to have a display 150 and other input devices like a keyboard 140, a mouse 142 or a touch-screen interface. The devices 34-48 may not necessarily provide such parts and may be adapted to be used by communicating information about the user interface 240 and input methods with other devices 34-48 (television set, motion sensing input device, computer or tablet over network, cell phone, etc.)

The Interface

Figure 6:
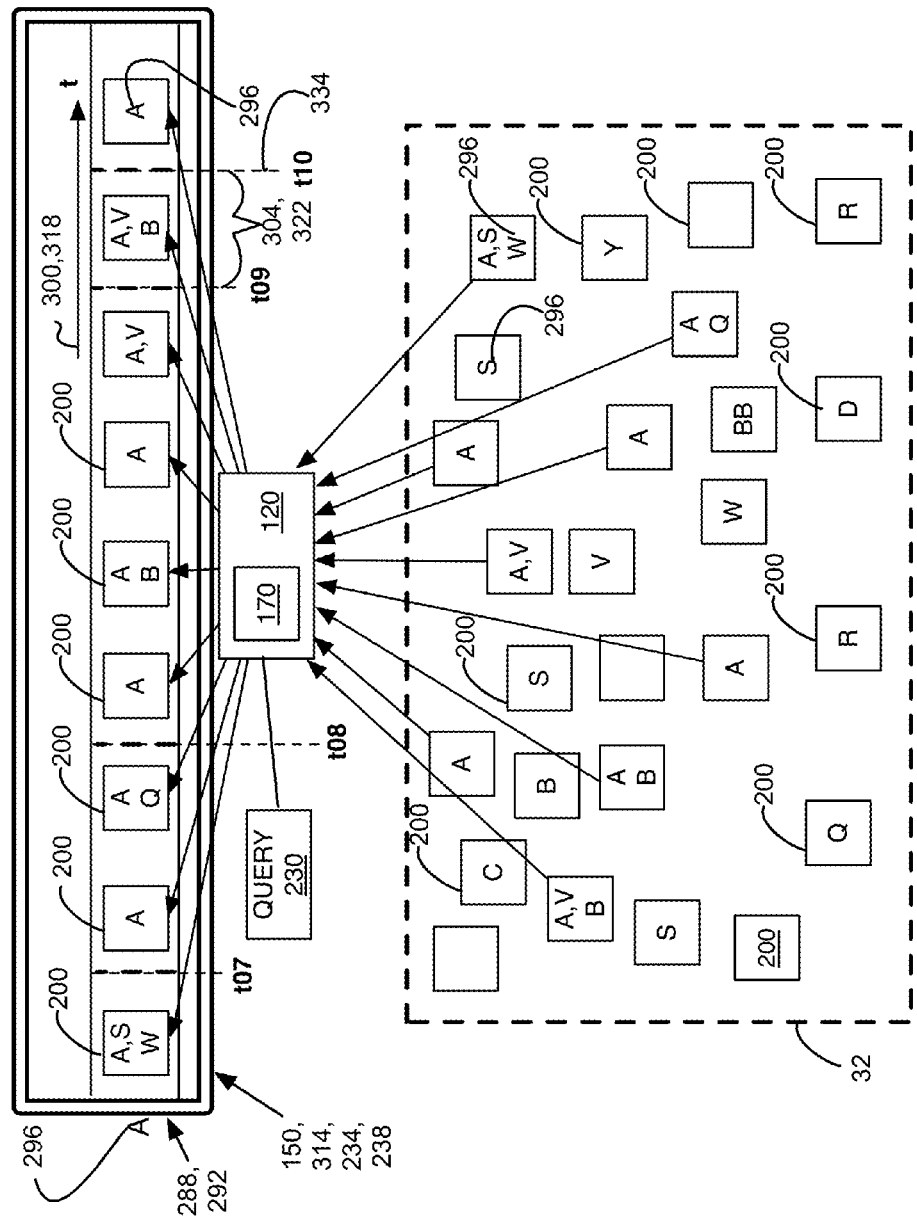
FIG. 6 is a schematic illustration of an exemplary axis layout.

FIG. 6 illustrates the interaction of the computer system 120 and software system 170 with an axis-based graphical user interface 238. An interface program providing a graphical user interface 234 for managing information elements 200 in accordance with an embodiment of the invention is installed on a machine, e.g. a computer system 120 as illustrated in FIG. 3. The interface 234 can be programmed using various programming languages e.g. C++, Java or other suitable programming languages. The programming of these languages is well known in the art and is adapted to be stored on a machine-readable medium and readable therefrom to provide executable instructions to a hardware system. It is believed that a skilled reader in software art is going to recognize this portion of the system that will, therefore, not be further described herein.

The graphical user interface 234 may run through the operating system 135 and the hardware 246 of the computer system 120 or, alternatively, through a network-based system e.g. client-server, and/cloud computing system as exemplified in FIG. 1 and FIG. 2. The interface 234 is adapted to display and manage information elements 200, generally provided on a basis of a query 230, which may be stored in one or many databases 32 (as illustrated in FIG. 6) that might be distributed in a combination of locations (e.g. multiple databases, web, cloud, etc.). Information elements 200 may include computer files, pictures, multimedia content, applications (i.e. computer programs), menu elements, sets of icons and/or other user-selectable elements, all of which shall henceforth be indiscriminately referred to as documents 200 to lighten the text without limiting the scope of the present invention.

An axis-based graphical interface 238 is adapted to graphically structure documents 200 in arrays 288 that arrange the documents 200 in rows and/or columns in a reasonably regular fashion and to allow navigation thereof by the user further to a query 230. The axis-based layout and ordering provide the user with information about the content of each document 200, its meaning and its relationships to the other documents 200 disposed on the axis 292. Navigation tools are provided with the axis-based user interface 238 to allow navigation through the documents 200 of a single axis 292 and of various axes 292 when a plurality of axes 292 is enabled. The display of documents 200 on an array 288, or axis 292, therefore allows contextual management of documents 200 as a flow, or an ongoing rational sequence of documents 200. An axis-based interface 238 thus helps to intuitively display a group of documents 200 and facilitate understanding and managing large sequences of documents 200 bearing a relation.

In a simplified exemplary form, an array 288 may be embodied as an axis of documents 292 (hereinbelow referred to as axis 292 to lighten the text), which groups documents 200 in a single row or column, as illustrated in FIG. 6. An axis 292 can be embodied as a substantially rectilinear arrangement of documents 200 adapted to dispose each document 200 on a straight or curved line. The axis 292 can be embodied as completely straight (rectilinear), slightly curved, substantially curved, circular, angled, following a particular shape or have a consistent shape over which documents 200 are disposed in a reasonably consistent fashion. The exact shape of the axis 292 as well as its disposition can vary—horizontal, vertical or other—in relation to the device's display 150. What matters, inter alia, is that the layout structure of an axis 292 provides a sequence of documents 200 from which a viewer can infer meaning, logical connections, contextual location, and/or relationships.

The axis 292 can be represented as a single axis 292, a double axis 292, or more axes 292. Axes 292 may be independent from one another (using distinct scales, or orderings, henceforth referred to as collation functions 300) or may form a group of axes 310 by sharing the same scale or collation function 300. Also, a document 200, attribute 296 or other property of an element contained in an axis 292 can be selected and used as a logical connector to create an additional axis 292 from an existing axis 292. This subsidiary axis 294 is meant to be temporary in some embodiments, serving as a way to view a specific set of additional documents 200 or highlight certain documents 200 from the original axis 292 without having to alter the entire workspace 306. It may originate from the logical connector document 200 or information element 200 and be disposed in non-parallel fashion thereto. The subsidiary axis's 294 position is preferably orthogonal to the original axis 292. However, the angle may vary. Like axes 292, logically connected axes 294 may be scrollable. More such logically connected axes 2924 can subsequently be created in the same fashion. Navigation among axes 292 and subsidiary axes 294 could be called "relational navigation".

Axes 292 may be disposed horizontally and/or vertically. Groups of axes 310 may be presented using one of the layouts or combining both. The axes 292 presented in the embodiments below are generally illustrated in the horizontal layout configuration. However, they could, all or in majority, be disposed vertically without departing from the scope of the present disclosure. Other possible graphical layouts of documents 200 might become obvious to a skilled reader in light of the present application and would be considered within the scope of this application.

When only a portion of the axis 292 is visible, a play of zoom, pan and scrolling movements along the axis 292 allows a user to navigate the axis 292 and change the series of documents 200 that are displayed in the display area 314 of the display 150. Scrolling movements can be performed in a variety of ways including but not limited to click-and-drag, pressing on the keys of a keyboard, gesturing to a motion-sensor or on a touch-screen.

Documents 200 might overlap or decrease in size so as to fit or maximize the space available in the display area 314. Selected documents 200 on an axis 292 can be magnified to increase the level of detail shown. Similarly, a small display area 314 could display only one document 200 out of the entire axis 292. The remaining documents 200 would not be shown in the display area 314 but would yet remain at their respective "virtual" position on the axis 292, ready to be displayed upon scrolling the axis 292. In other words, if we consider a mobile platform like a mobile phone having a small display 150, the small display 150 might only allow to efficiently exhibit one document 200 at a time. However, given that the displayed document 200 is part of an axis 292, the other documents 200 on the axis 292 would remain displayable in accordance with their respective position on the axis 292 when the axis is scrolled, navigated, gestured.

The documents 200 are selected to be disposed on the axis 292 on the basis of one or more attributes 296, and are ordered thereon according to a collation function 300, namely an ordered arrangement made by comparison, (e.g. a chronological order adapted to use a time scale 318. The attribute(s) and collation function parameters are specified in a query 230 that may be run by a user or by an automated function of the system. Indeed, each axis 292 groups documents 200 in accordance with, for example, a selected tag, category, keyword, document creator, or other attribute 296 that expresses a characterization of one or more document(s) 200 and that are configurable to represent intrinsic or extrinsic characteristics. The term "attribute" 296 will generally be used throughout the instant specification to lighten the reading of the text and will encompass other document properties or means for establishing commonality or relationships as described above unless otherwise specified.

Attributes 296 may be user-specified or system-specified. Generally, documents 200 bear a plurality of attributes 296 assigned by one or more user(s) (e.g. keyword, subject, project, creator, category, etc.), and a plurality of attributes 296 that are assigned by the system, such as, illustratively, file type, time of creation, number of views, time of last modification, file size, etc. Given the broad range of applicability of the present invention, the attributes 296 that may be assigned by the system and user, as well as the attributes 296 that can be desirable to use in the management of axes 292 might substantially vary from one field or user to another and however remain within the scope of present specification.

The selection of one or more attributes 296 (using Boolean logic for instance) in a query 230 determines which documents 200 will be displayed on the axis 292. If no specific attribute 296 is selected, the axis 292 will display all documents 200 in a default order, like the date of creation thereof. Thus, all documents 200 on the same axis 292 are normally associated with the selected set or combination of attributes 296 that are used as parameters for the axis 292. Third-party data, like publicity or user-targeted information, could also be added to an axis 292, either arbitrarily or according to user information, filtering and/or existing collation of axes 292 without departing from the scope of the present invention.

The documents 200 illustrated in FIG. 6 feature attributes 296 individually represented by a capital letter thereon, or none, in which case the documents 200 are left blank. Letter attributes 296 are used in the present application for illustrative purposes only while letter attributes are theoretically possible. More descriptive attributes 296 such as those described above are used in embodiments of the present invention. As is shown in FIG. 6, any document 200 can simultaneously feature multiple attributes 296, some user-specified and others system-specified. In fact, a preferred embodiment of the invention assigns a plurality of attributes 296 to every document 200. Other documents 200 illustrated on FIG. 6 are blank, or without any associated attribute 296, illustrating documents that could theoretically not be assigned any attribute 296, but that could nonetheless be created and found in a query 230 (e.g. a query 230 that would select all documents 200 contained in the database 32).

The query 230 in FIG. 6 here illustratively filters and selects documents 200 from the database 32 based on attribute 296 'A' for display on the axis 292. FIG. 6 further illustrates that the documents 200 selected from the database 32 by the query 230 are placed on the axis 292 in chronological order 318, another parameter that could be specified in the query 230. Indeed, an axis 292 also generally disposes the documents 200 resulting from the query 230 in accordance with a specified order or collation function 300, (e.g. chronological order, alphabetical order, statistical order, increasing file size, etc.). A collation function 300 might include dividing the axis 292 into successive collation units 304 (e.g. time units 322 in the case of a chronological order, which can illustratively be hours, days, months, years, etc.). A collation function 300 would thus dispose each document 200 along the axis 292 according to the value of a specified attribute 296 in relation to the collation units 304 of the axis 292 and the other documents 200 of the selected document set 228. Among collation functions 300, a chronological distribution of documents 200 on a time scale 318 is used in most embodiments of our work because of its intuitiveness (because any action or event takes place at a specific time and usually in sequence with other events or actions). While an axis 292 disposing documents in random fashion is also contemplated within the scope of the present specification, axes 292 disposing documents 200 according to a collation function 300 are illustrated embodiments because of the usefulness of ordering documents 200.

Figure 7:
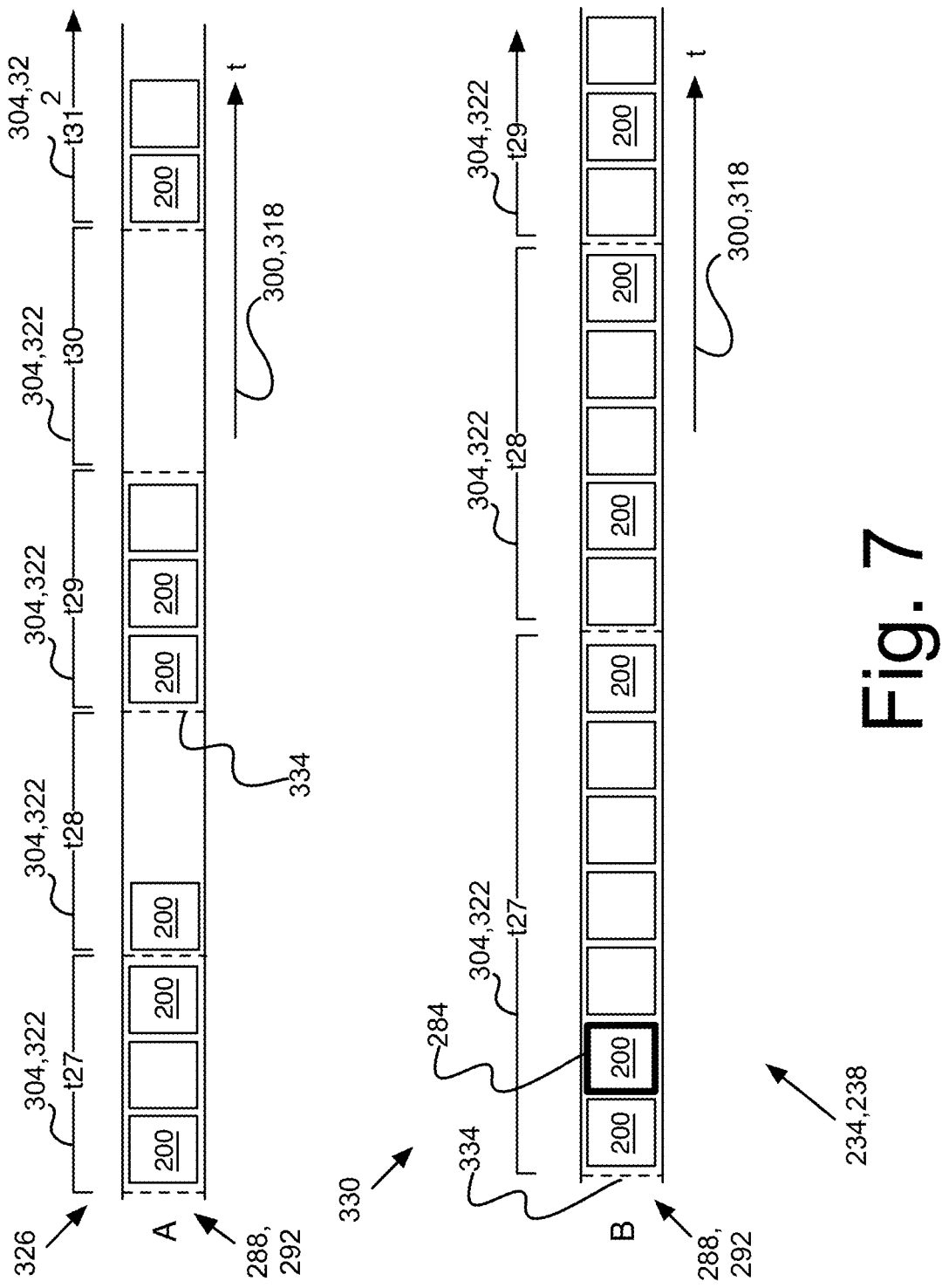
FIG. 7 is a schematic illustration of a linear and non-linear axis configurations.
Figure 11:
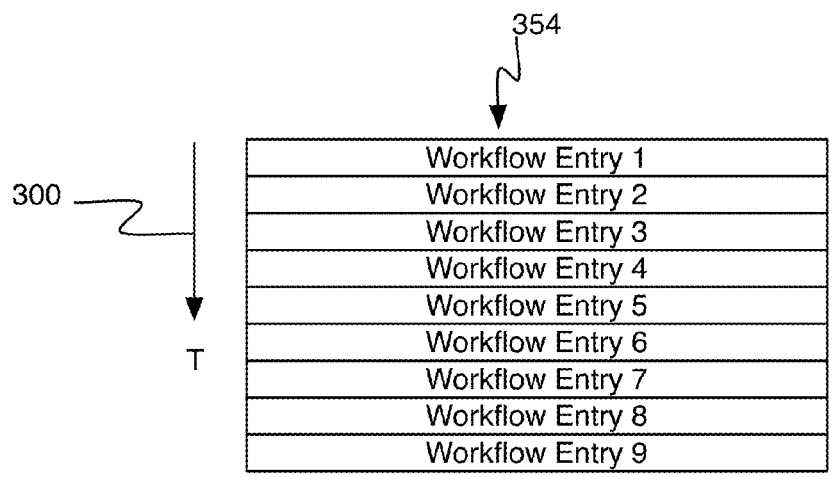
FIG. 11 is a schematic illustration of an exemplary list of workflow entries in accordance with at least one embodiment the present invention.
Figure 12:
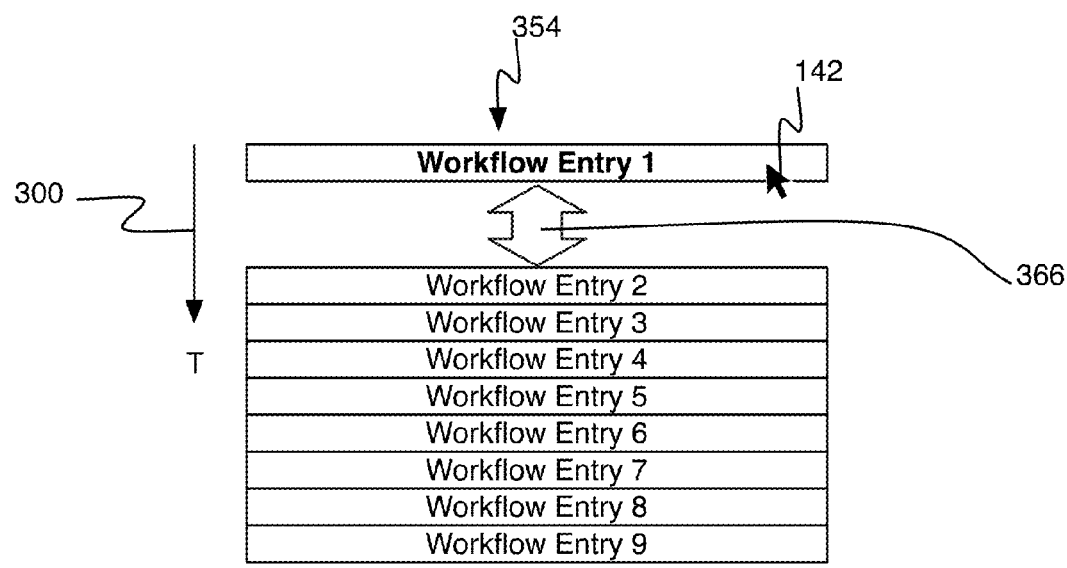
FIG. 12 is a schematic illustration of an exemplary list of workflow entries in accordance with at least one embodiment the present invention.

An axis 292 or a group of axes 310 may be embodied in a linear configuration 326 or a non-linear configuration 330. Both configurations are illustrated in FIG. 7 in a generic example. As can be appreciated from FIG. 7, a linear configuration 326 displays collation units 304 of the same graphical longitudinal size regardless of the number of documents 200 contained in each collation unit 304. The size of the documents 200 located within a given collation unit 304 can optionally be adjusted in accordance with the number of documents 200 located therein. For instance, documents 200 will be larger if there are few documents 200 in the collation unit 304 and smaller if many documents 200 are found therein. Alternatively, the documents 200 can remain the same size and can overlap, or be stacked, when their quantity exceeds the available space. Another possible way of making large numbers of documents 200 fit into a fixed-size collation unit 304 is to equip the collation unit 304 with a scroll bar allowing the user to navigate the collation unit 304 to reveal hidden documents 200. This also means that documents 200 in a linear configuration 326 may be displayed as an uneven sequence from a graphical point of view. Ultimately, a collation unit 304 in a linear configuration containing no document will appear as empty, or as a blank space on the display 150, but will still be the same size as the other collation units 304 of the axis 292.

Conversely, the non-linear configuration 330 displays collation units 304 of uneven longitudinal sizes because an even distribution of documents 200 along the axis 292 prevails over the linearity of the collation. In other words, document 200 size and a constant flow of documents 200 along the axis 292 are given primacy over having collation units 304 of equal graphical size. This provides a more efficient use of the space on the axes 292, but may provide less meaning to illustrate an evolution along time.

Turning now to FIG. 8 illustrating an exemplary spreadsheet-like listing, or table 350, of information related to sequential steps of a workflow 354. Each step 354 provides a series of columns 358 adapted to provide a specific type of information related to a step 362 of the workflow 354. In the embodiment of FIG. 9, the pointing device 142 is used to select workflow step #3 thus enabling the creation of a space 366 below workflow step #3. The space 366 is located below the selected step #3 and could alternatively be located above step #3, above the table 350, below the table 350 or elsewhere about the table 350. A preferred embodiment is presenting a close relationship between the selected step #3 and the array or axis 292 of documents 200, as illustrated in FIG. 10, because of the direct graphical relation between the selected workflow step #3 and documents 200 associated therewith. The rectilinear shape of the axis 292 is well suited to fit in a longitudinal space 366 created between two rows representing steps of a workflow. This ensures a strong graphical meaning for a viewer who wants to appreciate the documents 200 associated with a desired workflow step. The illustrative example of the axis 292 in FIG. 10 shows twelve (12) documents 200 associated with step #3. Conversely, a smaller and a larger number of documents 200 could be presented on the axis 292 if needed. In the event a larger number of documents 200 have to be displayed for the available width allowed for displaying the axis 292, user-actuable navigation elements 370 are displayed on each side of the axis 292.

Figure 13:
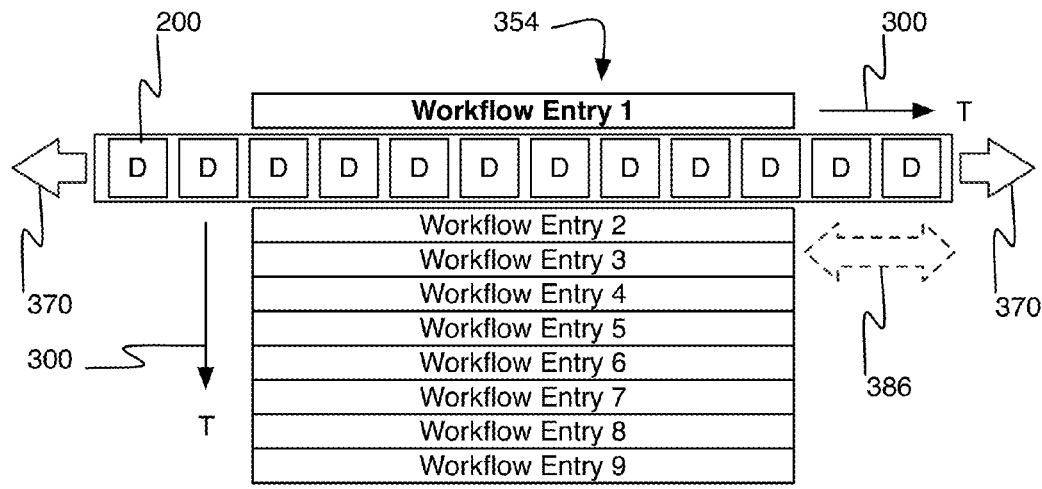
FIG. 13 is a schematic illustration of an exemplary list of workflow entries and an axis in accordance with at least one embodiment the present invention.
Figure 14:
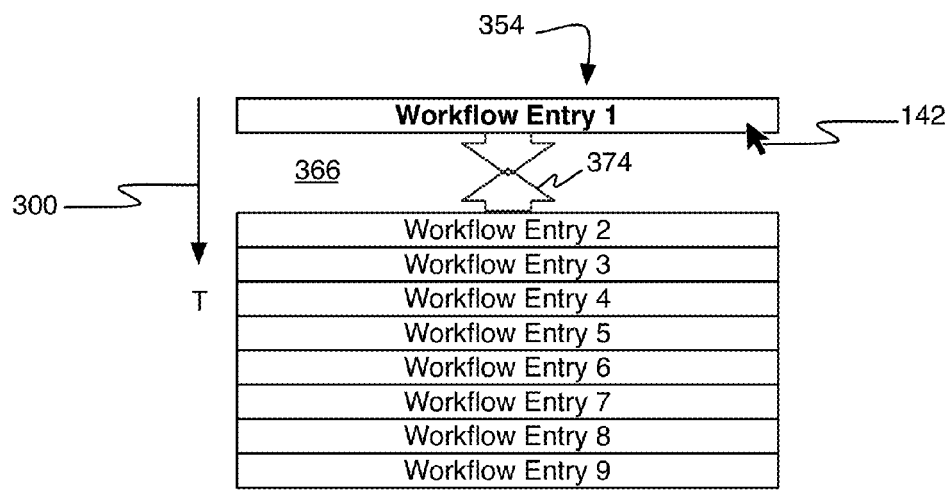
FIG. 14 is a schematic illustration of an exemplary list of workflow entries in accordance with at least one embodiment the present invention.

A simplified table 350 is illustrated in FIG. 11 through FIG. 33 to focus on the illustrative steps of the workflow 354. It can be appreciated from FIG. 13 that two distinct collation functions 300 are used; one for the sequential steps of the workflow 354 and the other for an illustrative chronological arrangement of the documents 200 of the axis 292. The collation functions could be different or similar without departing from the scope of the present invention. FIG. 14 illustrates that a selection of the workflow entry 1, while it is expanded to display an axis of documents 200 associated thereof, is removing the axis 292 and closing 374 the space 366. It has to be noted that a visually distinctive feature, in the present situation the text is put in bold, is applied to the selected workflow entry #1 (WF#1) to ensure a viewer appreciate clearly which WF entry is associated with the displayed axis 292. The WF entry can serve as an axis header to properly identify each axis 292.

Figure 15:
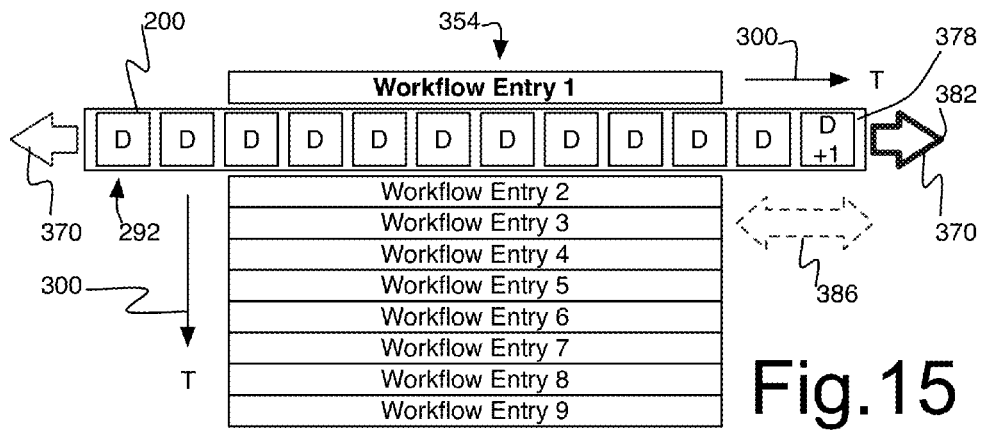
FIG. 15 is a schematic illustration of an exemplary list of workflow entries and the navigation within an axis in accordance with at least one embodiment the present invention.
Figure 16:
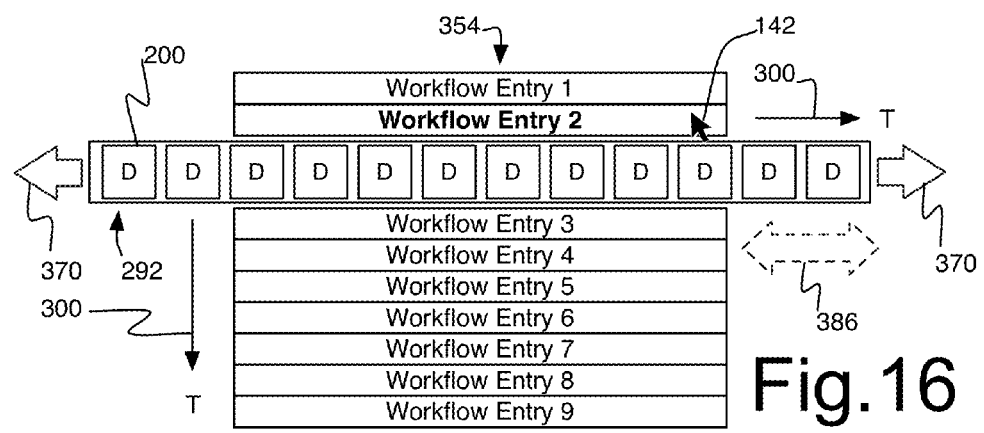
FIG. 16 is a schematic illustration of an exemplary list of workflow entries and an axis in accordance with at least one embodiment the present invention.
Figure 17:
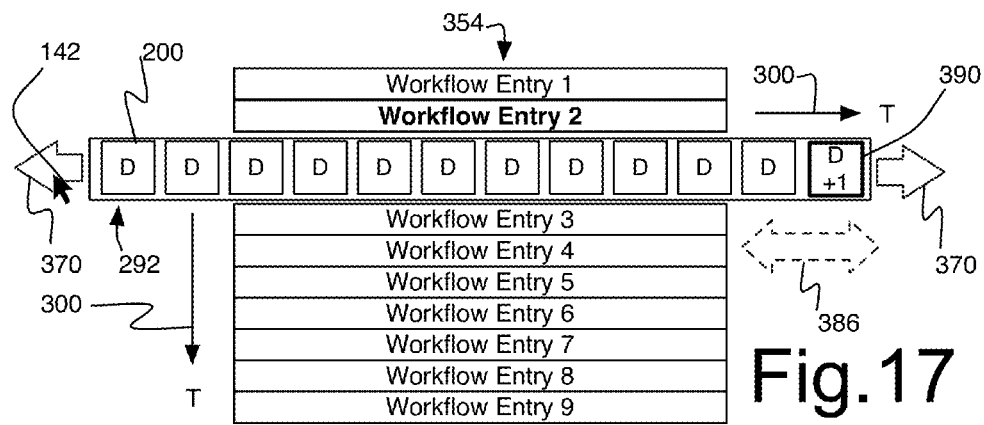
FIG. 17 is a schematic illustration of an exemplary list of workflow entries and the navigation within an axis in accordance with at least one embodiment the present invention.
Figure 18:
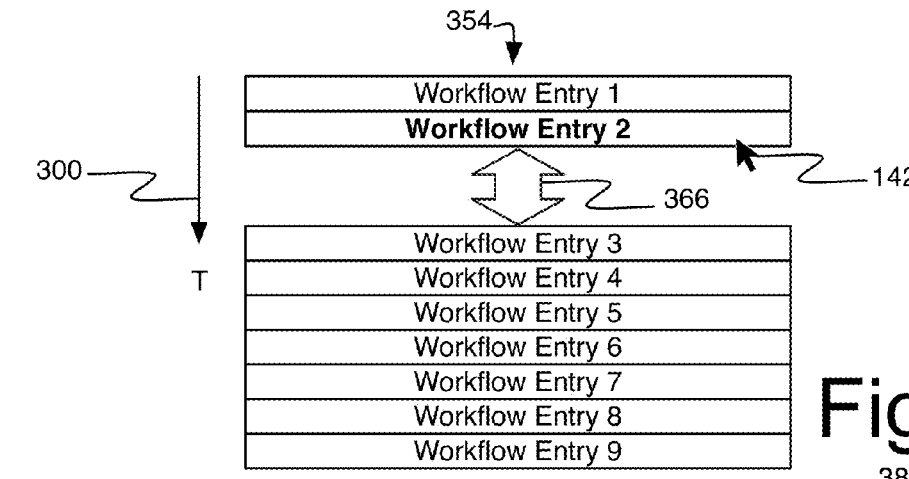
FIG. 18 is a schematic illustration an exemplary list of workflow entries and an axis in accordance with at least one embodiment the present invention.

Turning to FIG. 15, an additional document 378 is displayed on the axis 292. It is the last document 200 in time to be associated with WF#1 and is thus located on the extreme right of the axis 292 thus reflecting the chronological collation function 300 of the axis 292. The navigation element 370 on the right is now in bold to indicate another document 200, not displayed, can be displayed if the axis 292 is further navigated 386 on the right side. WF#2 is selected by a user and WF#1 is closed while WF#2 is expanded to display an axis 292 of documents 200 displaying documents 200 related to the expanded WF#2. While the axis 292 is displayed, a new document 200, 390 is automatically displayed by scrolling the existing documents 200 to the left as shown in FIG. 17. The new document 390 is visually distinctive with a bold frame to further identify it is new.

Figure 19:
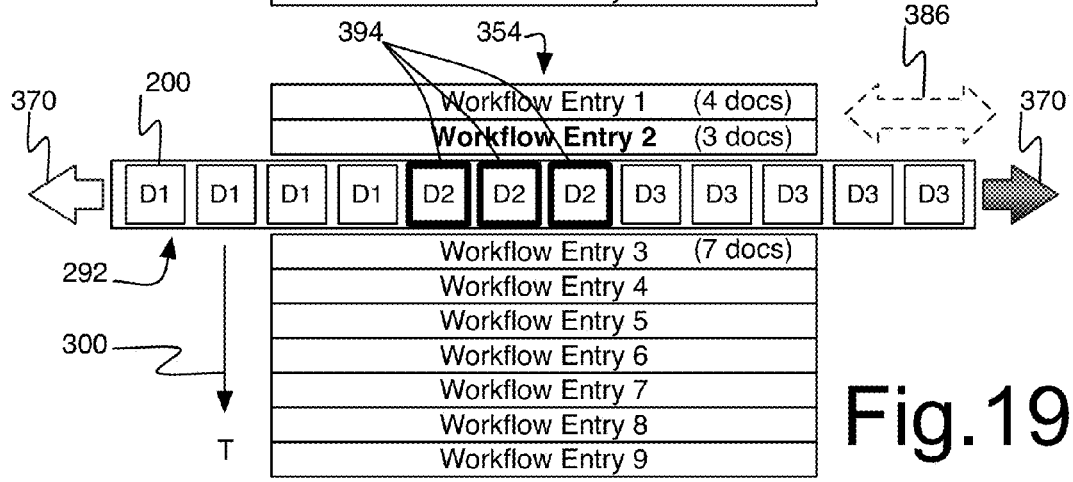
FIG. 19 is a schematic illustration of an exemplary list of workflow entries and a selection of related information elements within an axis in accordance with at least one embodiment the present invention.
Figure 20:
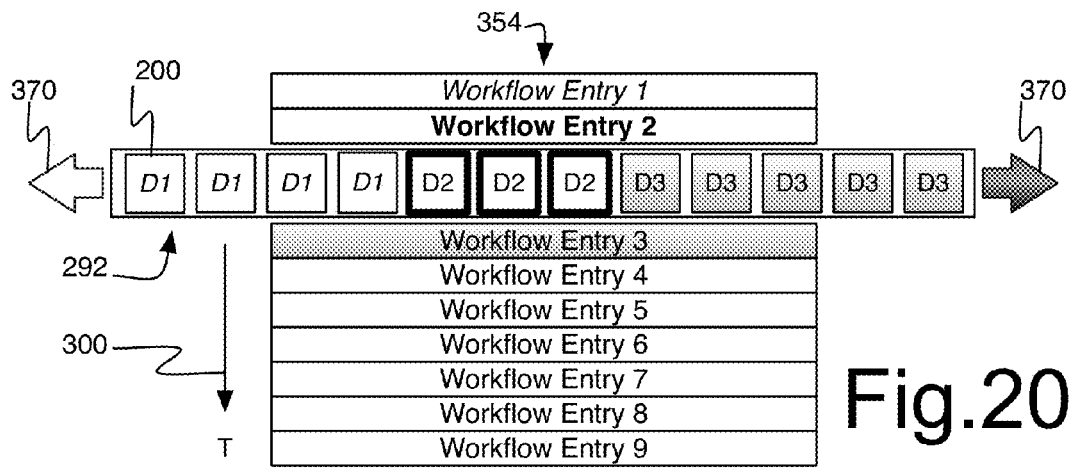
FIG. 20 is a schematic illustration of an exemplary list of workflow entries and a plurality of selections of related information elements within an axis in accordance with at least one embodiment the present invention.
Figure 21:
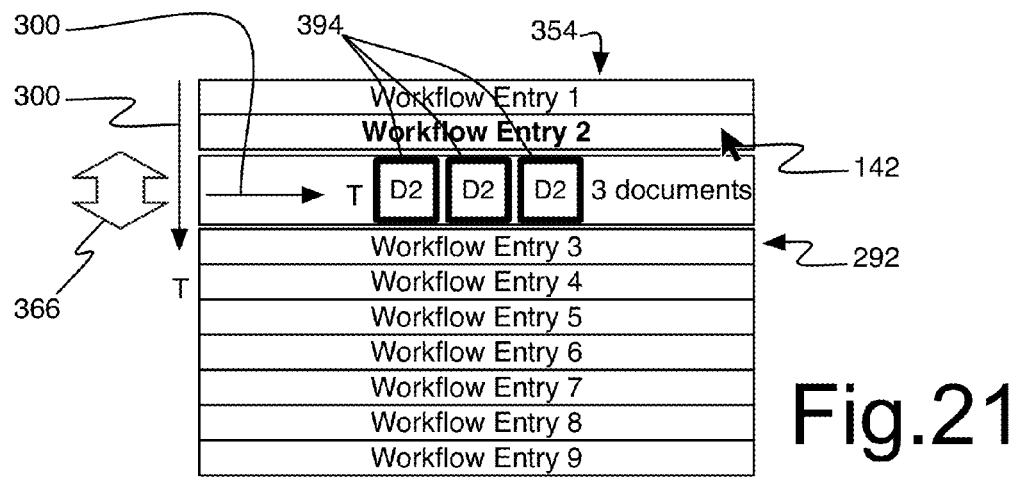
FIG. 21 is a schematic illustration of an exemplary list of workflow entries and an axis in accordance with at least one embodiment the present invention.
Figure 22:
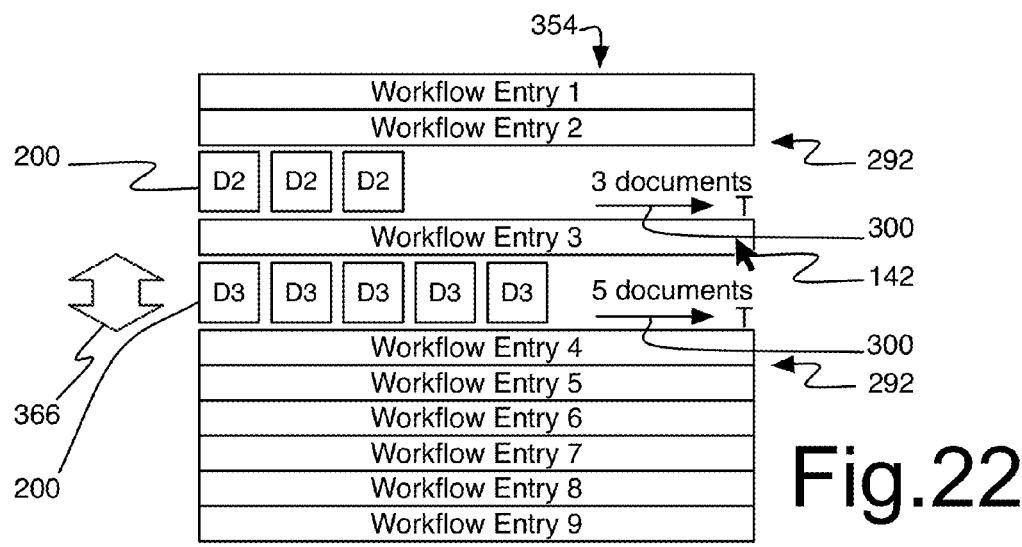
FIG. 22 is a schematic illustration of an exemplary list of workflow entries and a plurality of axes in accordance with at least one embodiment the present invention.

FIG. 18 through FIG. 21 are illustrating another embodiment where the axis 292 displays a continuity of documents 200 of a plurality of WF entries to further provide to a viewer a perspective of the documents 200 found before and after a selected WF entry. As shown in FIG. 19, the three (3) documents 200, 394 associated with WF#3 are displayed with a bold frame associated with the bold text used for identifying WF#3. The four documents 200 before are associated with WF#1 and the seven (7), after, of which only five (5) are displayed, are found after, to the right of the axis of documents 292. Further graphical discrimination can be applied to both the WF entries and the documents 200 respectively associated therewith without departing from the scope of the present invention as illustrated in FIG. 20. FIG. 21 illustrate an embodiment where only three (3) documents are present along the axis 292 thus fitting within the width of the WF entries identification. FIG. 22 illustrate a further embodiment where two WF entries are expanded to simultaneously display corresponding axes 292 of documents 200. Any number of simultaneously displayed axes 292 can be used if desired.

Figure 23:
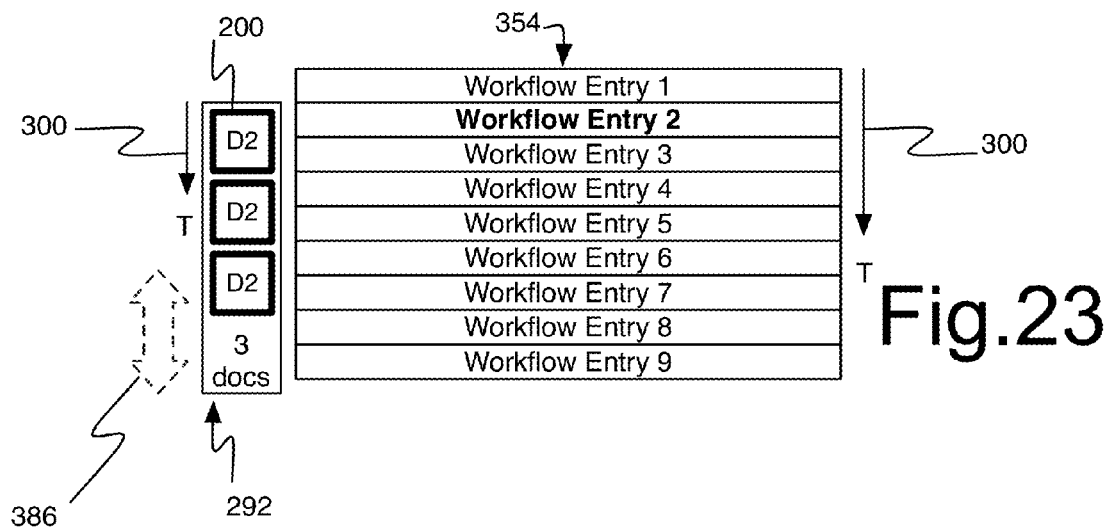
FIG. 23 is a schematic illustration of an exemplary list of workflow entries and an axis in accordance with at least one embodiment the present invention.
Figure 24:
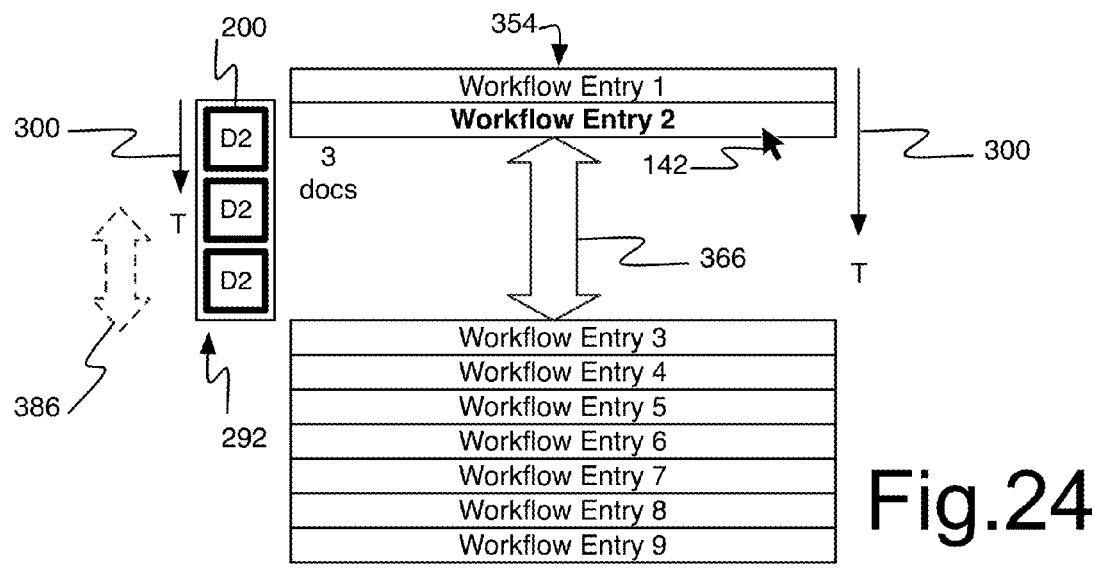
FIG. 24 is a schematic illustration of an exemplary list of workflow entries and an axis in accordance with at least one embodiment the present invention.
Figure 25:
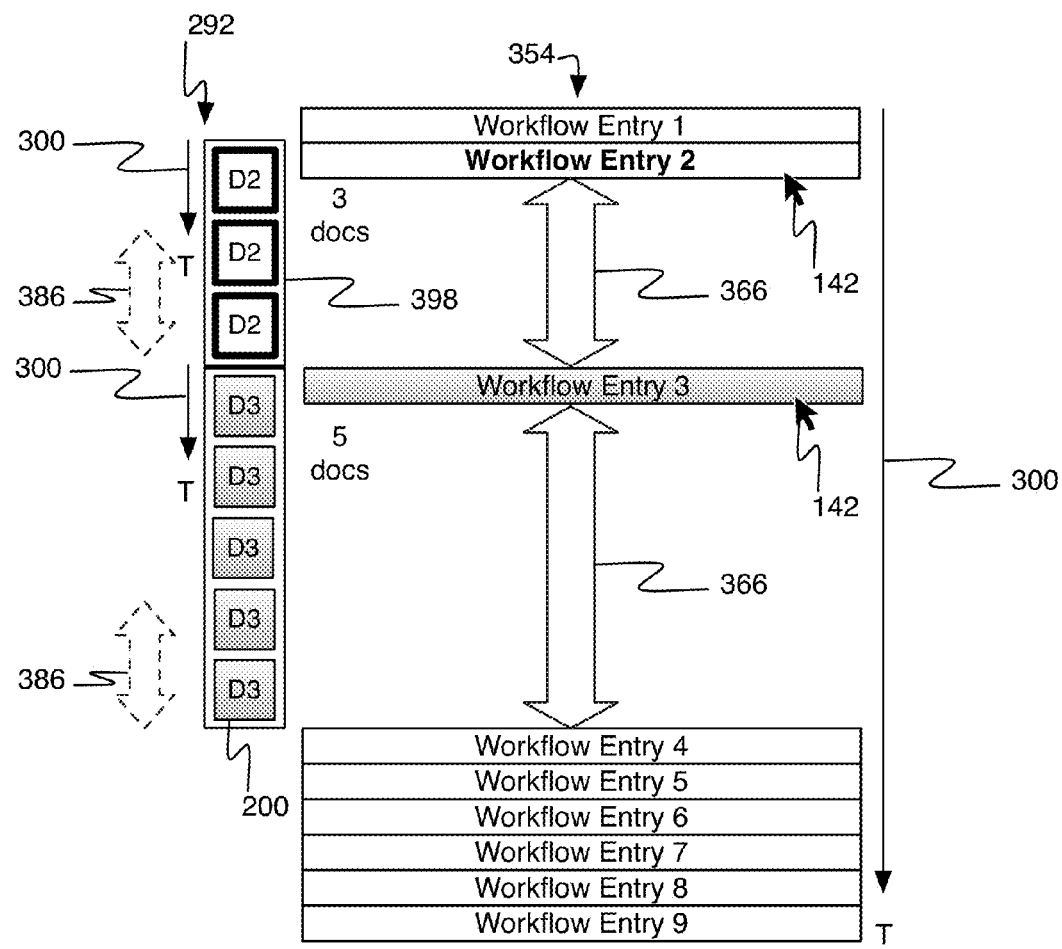
FIG. 25 is a schematic illustration of an exemplary list of workflow entries and an axis in accordance with at least one embodiment the present invention.
Figure 26:
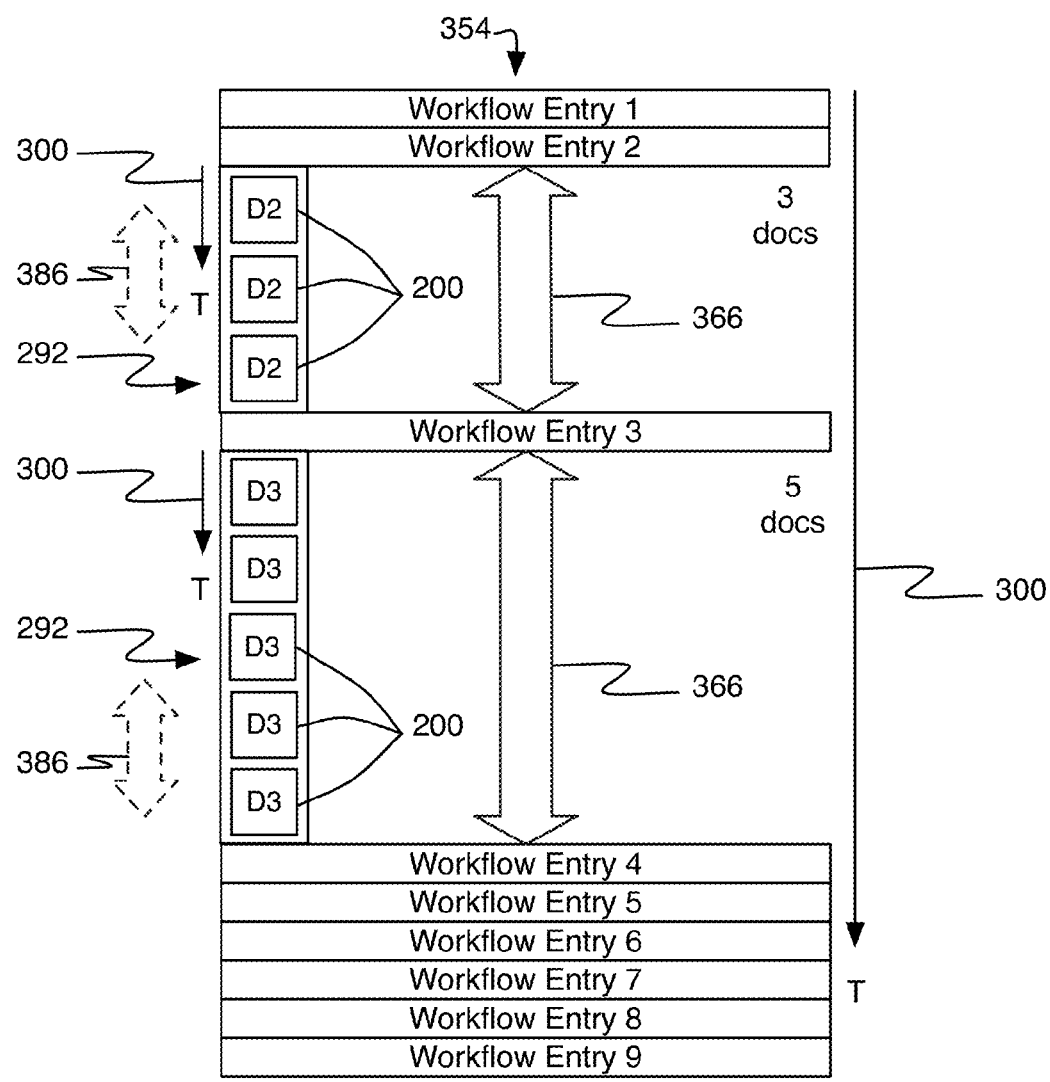
FIG. 26 is a schematic illustration of an exemplary list of workflow entries and an axis in accordance with at least one embodiment the present invention.
Figure 27:
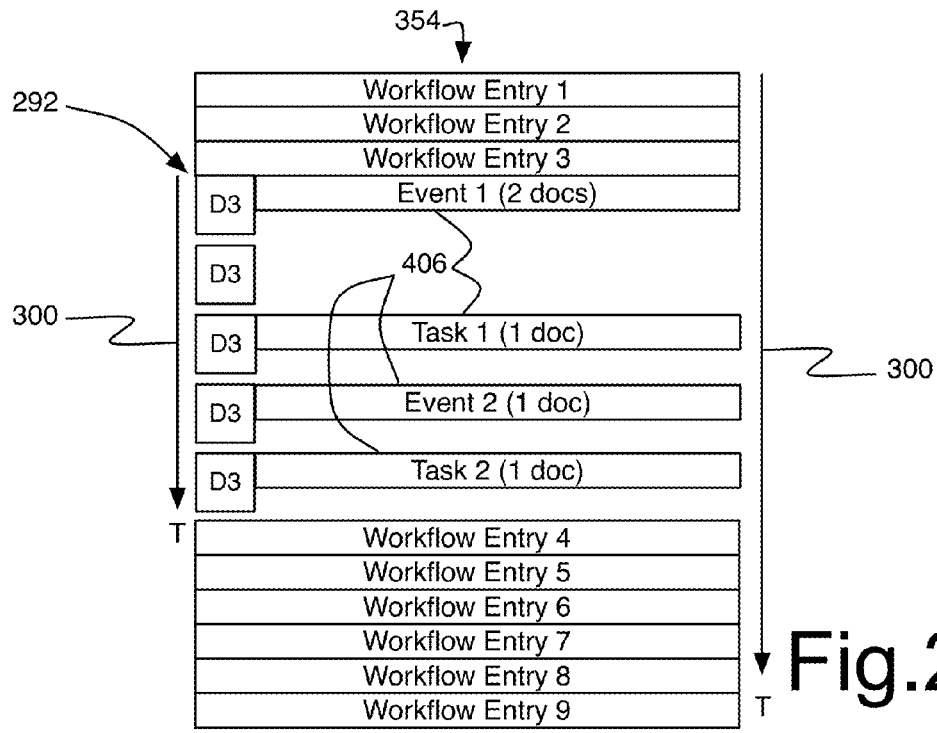
FIG. 27 is a schematic illustration of an exemplary list of workflow entries and an axis in accordance with at least one embodiment the present invention.
Figure 28:
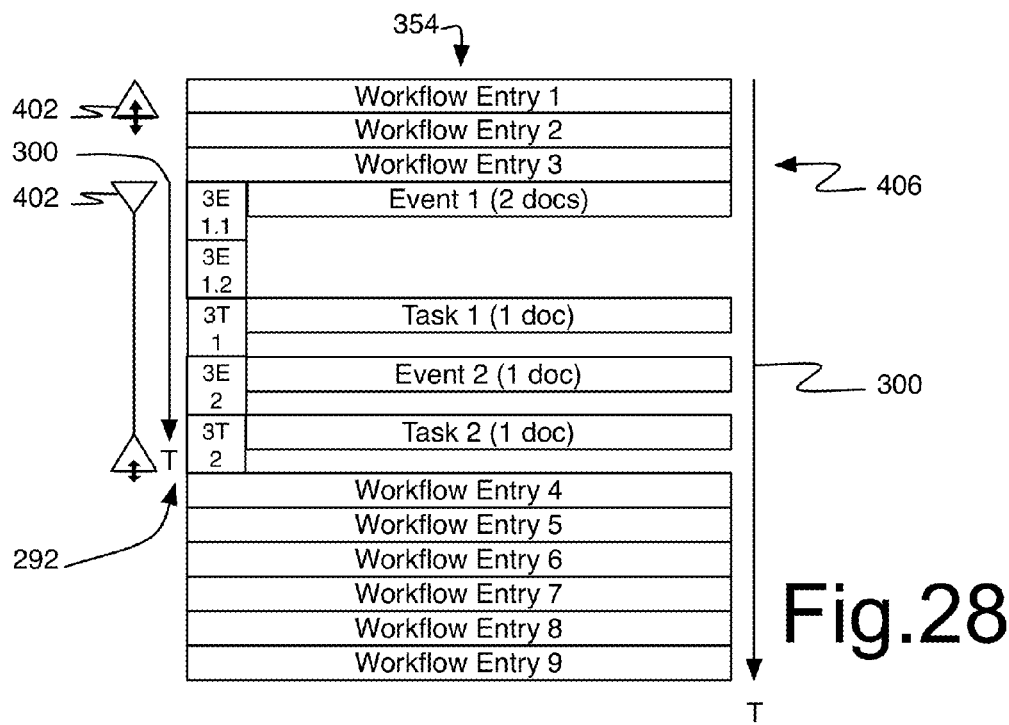
FIG. 28 is a schematic illustration of an exemplary list of workflow entries, a sub lists of docket entries and an axis in accordance with at least one embodiment the present invention.

FIG. 23 through FIG. 25 illustrate another embodiment where the axis 292 is vertically disposed—or disposed parallel with the identification of the plurality of WF entries. Similar functions and features, as presented before in respect with horizontal (orthogonal) axis of documents 292, can be appreciated by a skilled reader. The skilled reader can contemplate an additional separator 398 separating documents related to different WF entries. Moving now to FIG. 26 illustrating en embodiment where the documents 200 of each expanded WF entries are disposed vertically between two WF entries. FIG. 27 further distinguish each WF entry in distinct WF sub-entries 406, namely, for instance, events and tasks. A WF entry can have a plurality of WF sub-entries 406. An expanded WF entry can expand all its WF sub-entries 406, as illustrated in FIG. 28, or selectively expand one, some, at will, WF sub-entries 406. An expander 402 can be used to expand or contract a WF entry and/or sub-entries 406, by a simple selection thereof, for instance, and also be used to visually appreciate the expansion state of WF entries and sub-entries 406.

Figure 29:
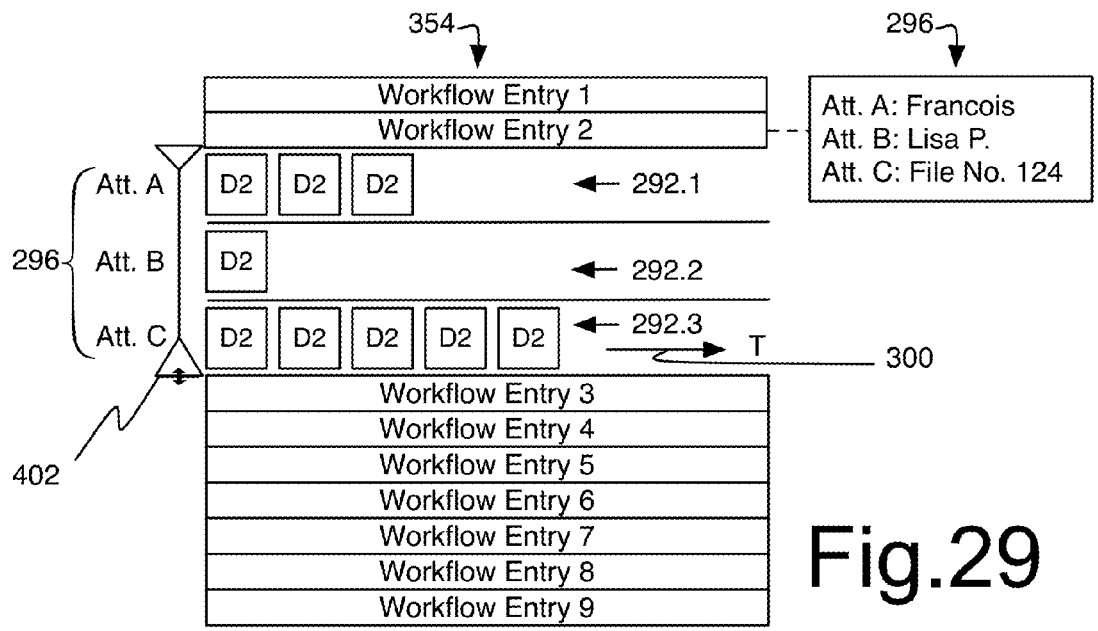
FIG. 29 is a schematic illustration of an exemplary list of workflow entries and a plurality of axes in accordance with at least one embodiment the present invention.
Figure 30:
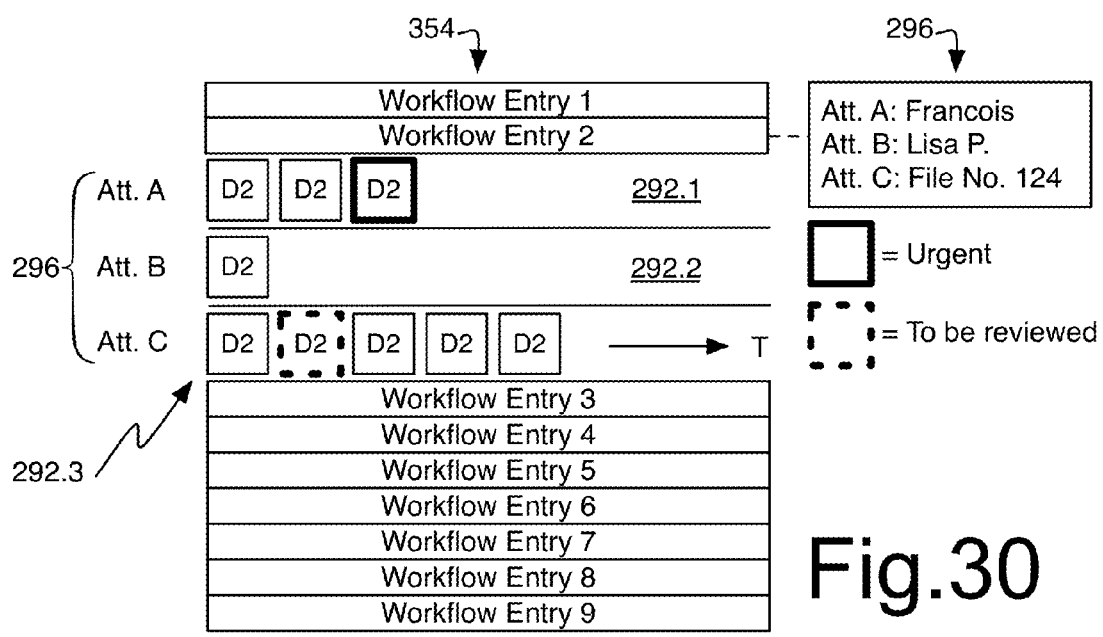
FIG. 30 is a schematic illustration of an exemplary list of workflow entries, a plurality of axes and Visual Distinctive Features applied on information elements within the axes in accordance with at least one embodiment the present invention.
Figure 31:
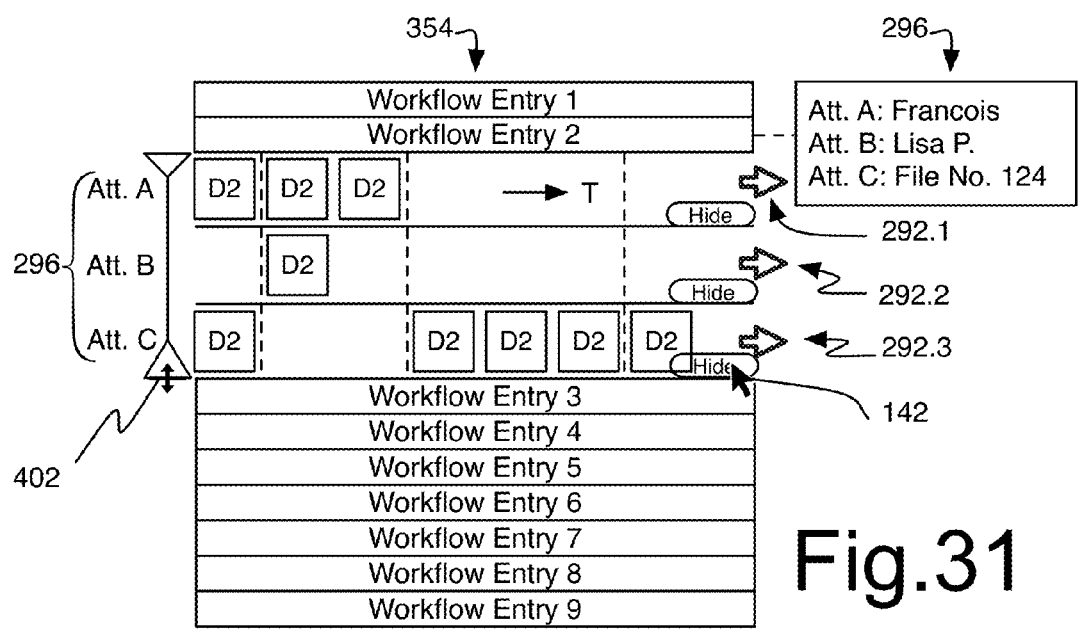
FIG. 31 is a schematic illustration of an exemplary list of workflow entries and a plurality of axes in accordance with at least one embodiment the present invention.
Figure 32:
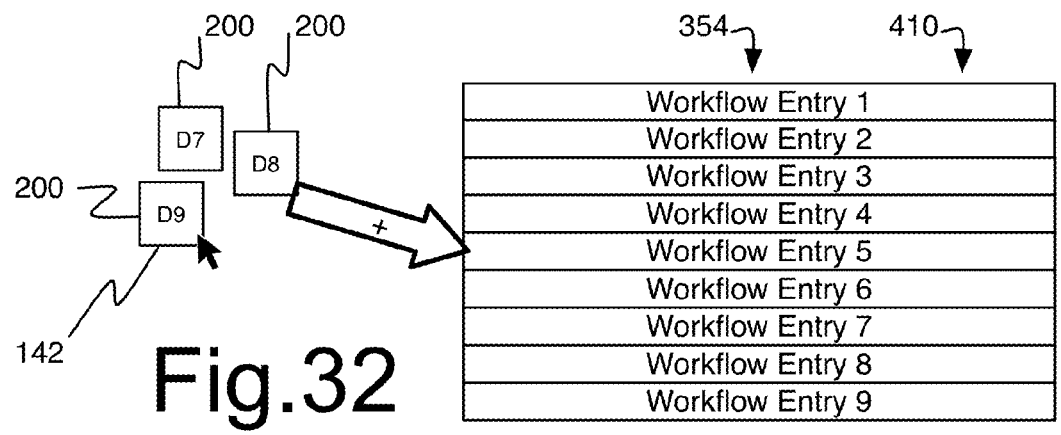
FIG. 32 is a schematic illustration of an exemplary list of workflow entries and information elements being inserted in a specific workflow entry in accordance with at least one embodiment the present invention.

Turning now to FIG. 29 that illustrates an exemplary embodiment where a WF entry is using attributes 296 adapted to be associated with documents 200 associated with the WF entry 354 to further classify the documents. In the present example, Attributes A, B and C are used to further classify the documents 200 associated with WF#2. In the illustrated example, an expansion of three distinct axes 292.1, 292.2 and 292.3 is provided and the three axes are displayed (could be less). This allows an even better sorting and displaying of documents 200 associated with a WF entry and could be configured with more attributes 296. With an action all the three axes 292.1, 292.2 and 292.3 could be merged into a single axis 292 (not illustrated) and vice-versa. Other possible attributes 296 could be used to further discriminate the documents 200 displayed on the axes 292 as it is depicted in FIG. 30 where the attribute "urgent" is associated with a bold frame applied to the documents 200 on the axes 292. This way a viewer can easily appreciate many additional information in a glance. Other variations of how to use attributes 296 in conjunction with the documents 200 and the axes 292 are contemplate by the present application. FIG. 31 further depicts another embodiment using collation units 304 along the axes 292.1, 292.2 and 292.3. Each axis 292.1, 292.2 and 292.3 can be selectively hidden to manage the viewing area available to a user.

Figure 33:
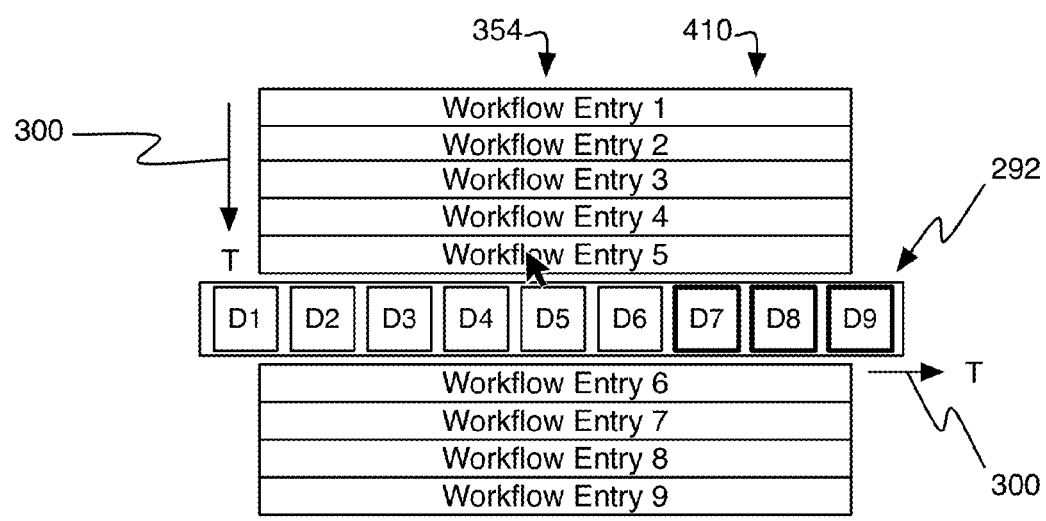
FIG. 33 is a schematic illustration of an exemplary list of workflow entries and an axis in accordance with at least one embodiment the present invention.

The WF entries have been described above as a means to display documents 200 associated with each WF entry 354. In accordance with another embodiment of the present invention, the WF entries 354 can be used to associate (add) documents 200 to a selected WF entry 354. In other words, the WF entries 354 can be used as an interaction tool 410 adapted to provide at least one, preferably many, proposed preset collections of attributes where to drag (for instance) documents 200 thereon to associate the dragged documents 200 with a WF entry and the attributes 296 associated therewith. The documents 200 to associate to a WF entry can be dragged on the corresponding WF entry or can be associated by other means like a contextual menu or a predetermined set of selection from a user. The interaction tool 410 is thus a tool adapted to receive documents 200 and also to display documents 200 as it has been extensively described above. The interaction tool 410 of an embodiment of the invention is a unified tool adapted to offer a simplified way to add (FIG. 32) and retrieve (FIG. 33) documents 200 from (FIG. 32) and for a user to see (FIG. 33). In the present example illustrated in FIG. 32 and FIG. 33, three documents D7-D9 are added to WF#5 and are later displayed along the axis 292 associated with WF#5 and identified in bold since they are newly added.

Figure 34:
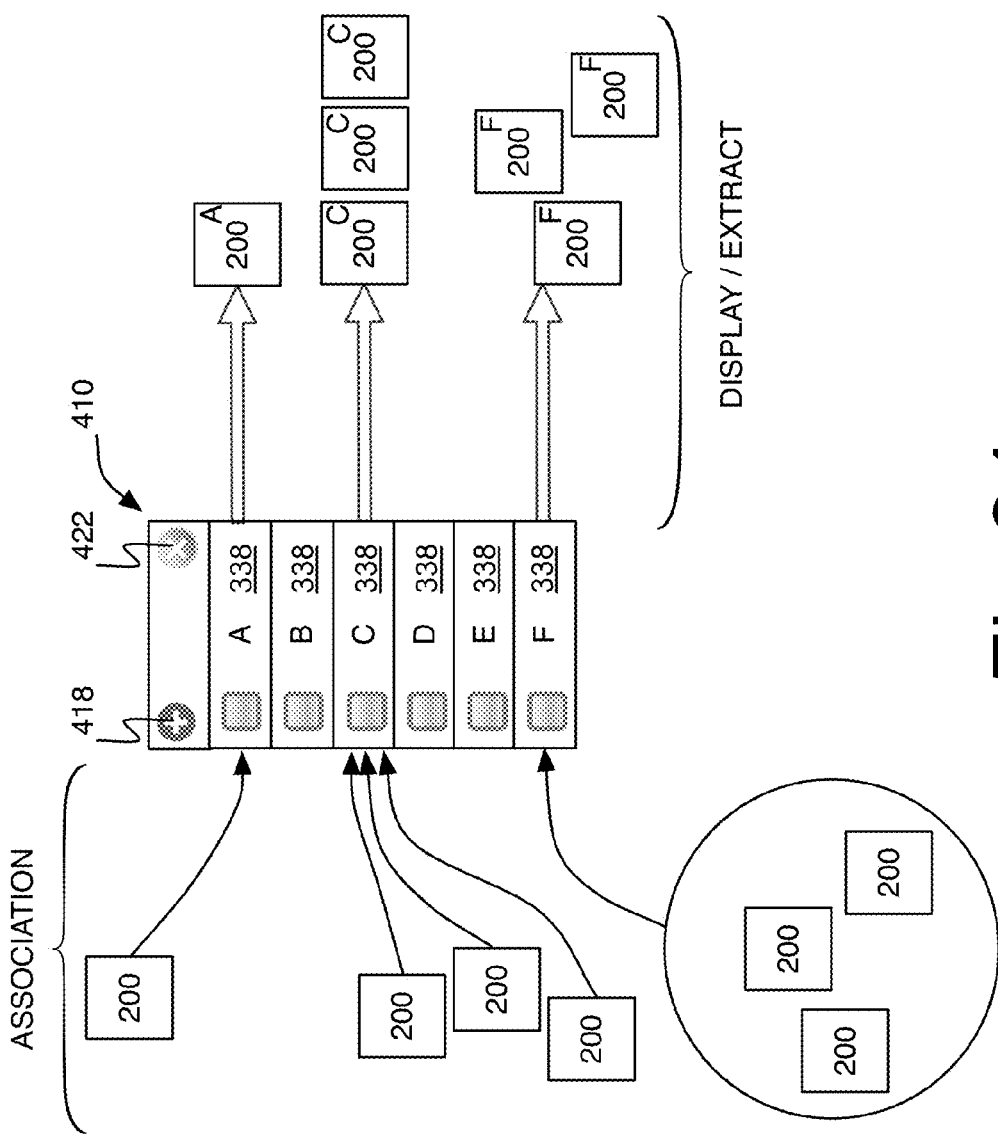
FIG. 34 is a schematic illustration of information elements being inserted at different location of the interaction tool in accordance with at least one embodiment the present invention.
Figure 35:
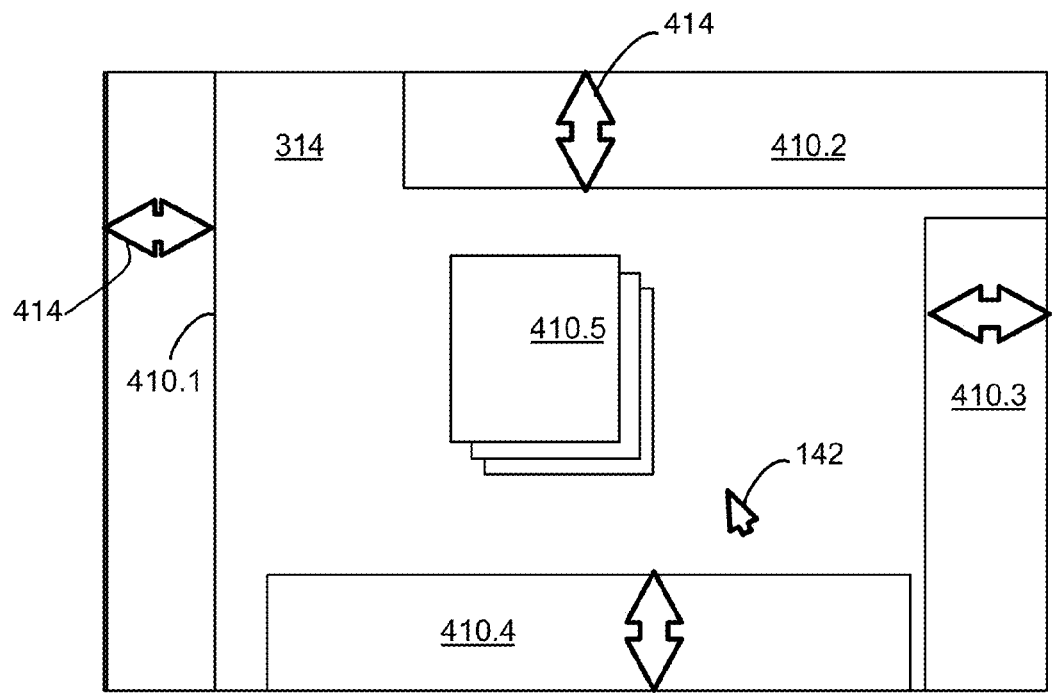
FIG. 35 is a schematic illustration of an exemplary a various locations for interaction tools in accordance with at least one embodiment the present invention.
Figure 36:
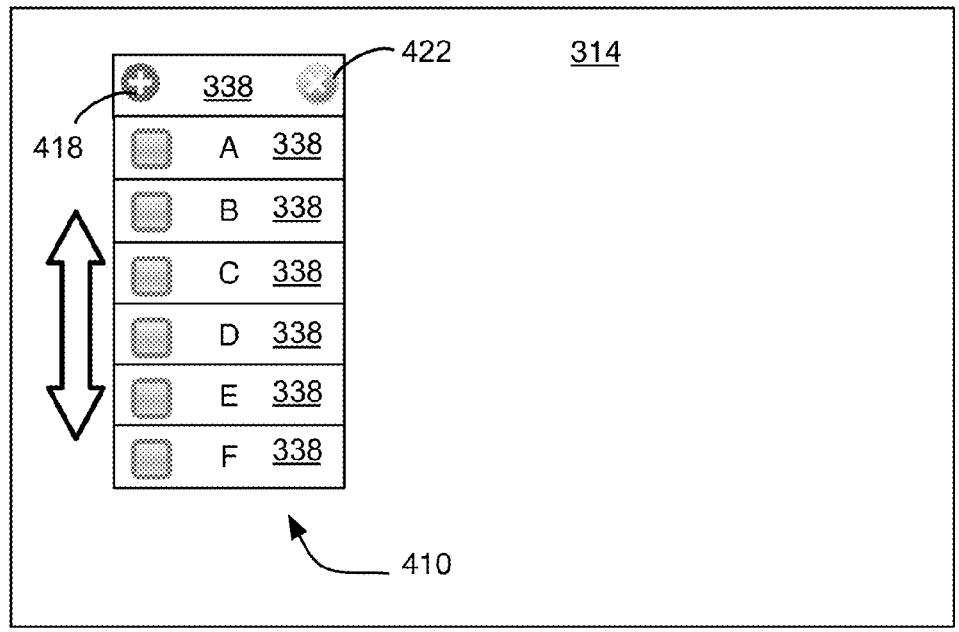
FIG. 36 is a schematic illustration of an interaction tool in accordance with at least one embodiment the present invention.
Figure 37:
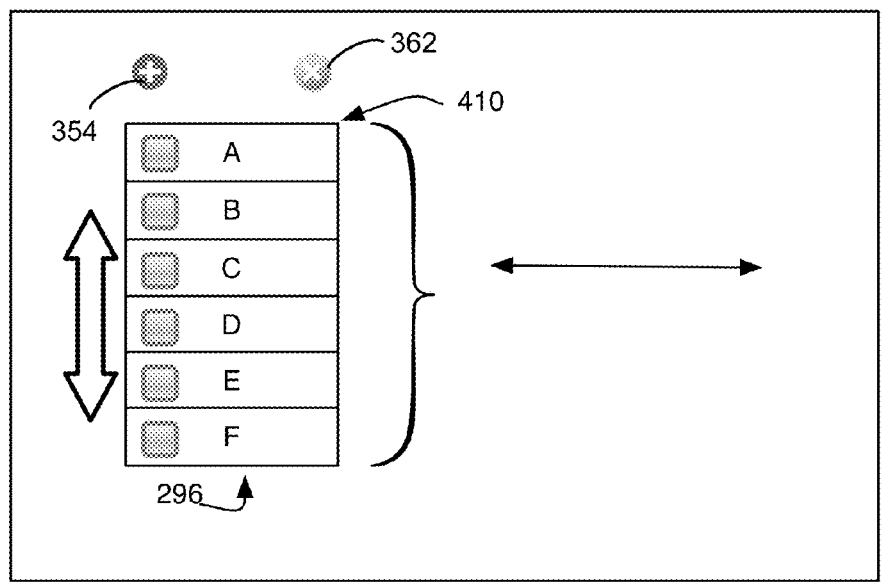
FIG. 37 is a schematic illustration of an interaction tool in accordance with at least one embodiment the present invention.
Figure 38:
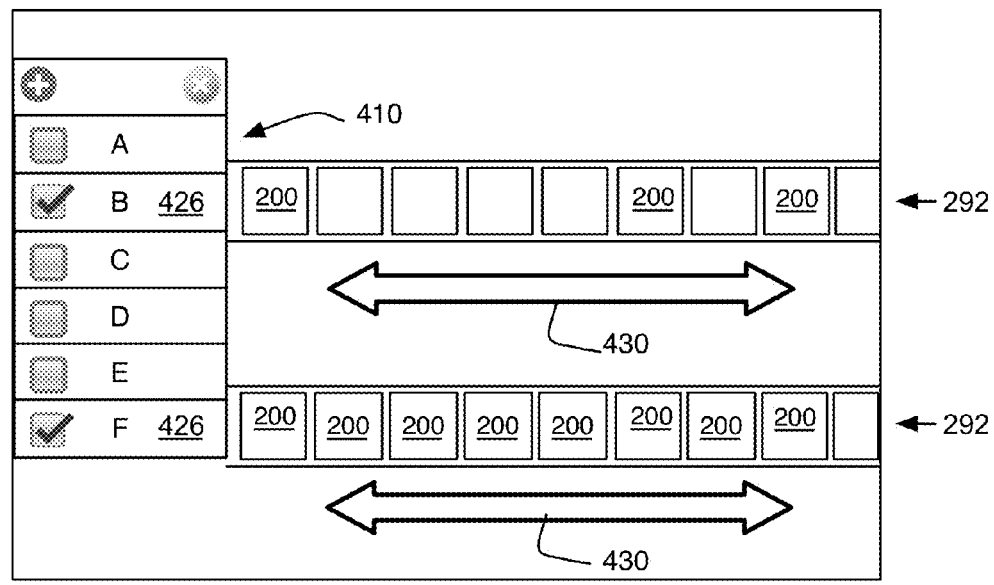
FIG. 38 is a schematic illustration of an interaction tool and a plurality of axes in accordance with at least one embodiment the present invention.

FIG. 34 illustrates one of the two roles of the interaction tool 410. The interaction tool 410 further proposes a function to add 418 an information element 200 in the interaction tool 410 and close 422 the interaction tool 410. The second role of the interaction tool is to provide a way to open axes 292. FIG. 35 depicts a plurality of configurations, positions and docking of the interaction tool 410 that can optionally be expanded and contracted 414 at will. FIG. 36 and FIG. 37 depict a collapsible interaction tool 410 that can be moved on a display 314 to fit a user's need. Elements 200 from the interaction tool 410 are embodied to be selected with a check box to display respective axes 292 of documents 200 in FIG. 38. In this embodiment, the axes 292 are laterally expanding 430 from the interaction tool 410 and remain connected to the interaction tool 410 to ensure a graphical relationship with their respective interaction element 426.

Figure 39:
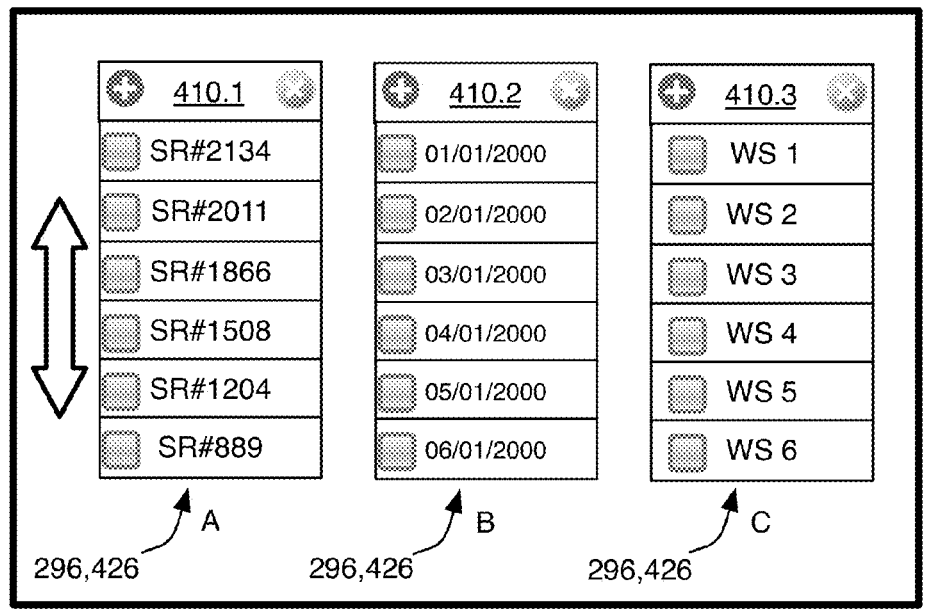
FIG. 39 is a schematic illustration of a plurality of interaction tools in accordance with at least one embodiment the present invention.
Figure 40:
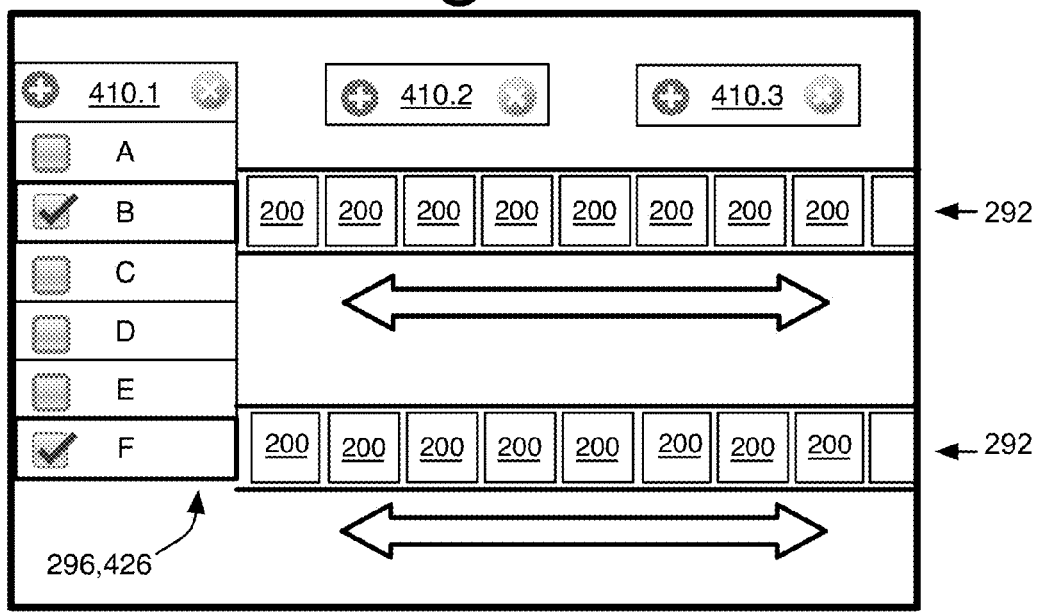
FIG. 40 is a schematic illustration of an interaction tool and a plurality of axes in accordance with at least one embodiment the present invention.

FIG. 39 depicts different configurations of interaction tool 410.1 (matter number), 410.2 (dates), 410.3 (Workspace entries). Selections of interaction elements 426 can be distinctively displayed along with a similar graphical distinction (for instance a bold frame) applied to the associated axes 292. FIG. 40 shows an embodiment where expanded axes 292 from one interaction tool 410.1 may cause the other interaction tools 410.2 and 410.3 to collapse.

Figure 41:
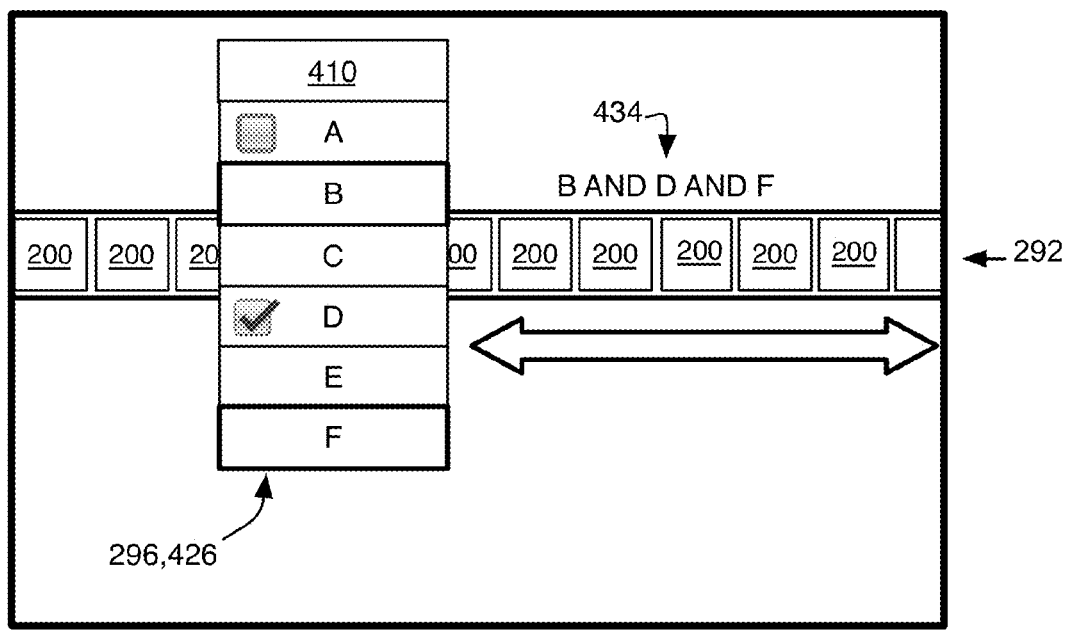
FIG. 41 is a schematic illustration of an interaction tool and an axis in accordance with at least one embodiment the present invention.

FIG. 41 illustrates an interaction tool 410 vertically connected with its associated axis 292 although the axis 292 passes under the interaction tool 410 and is laterally scrollable. Further, in FIG. 41, the selection of different interaction elements 426 is used as a basis to construct a logical query 434 used to determine which elements 200 should be displayed on the axis 292 on a basis of a combination of the attributes 296. Note different graphical discriminators applied to the interaction elements 426 are mixed in FIG. 41.

Figure 42:
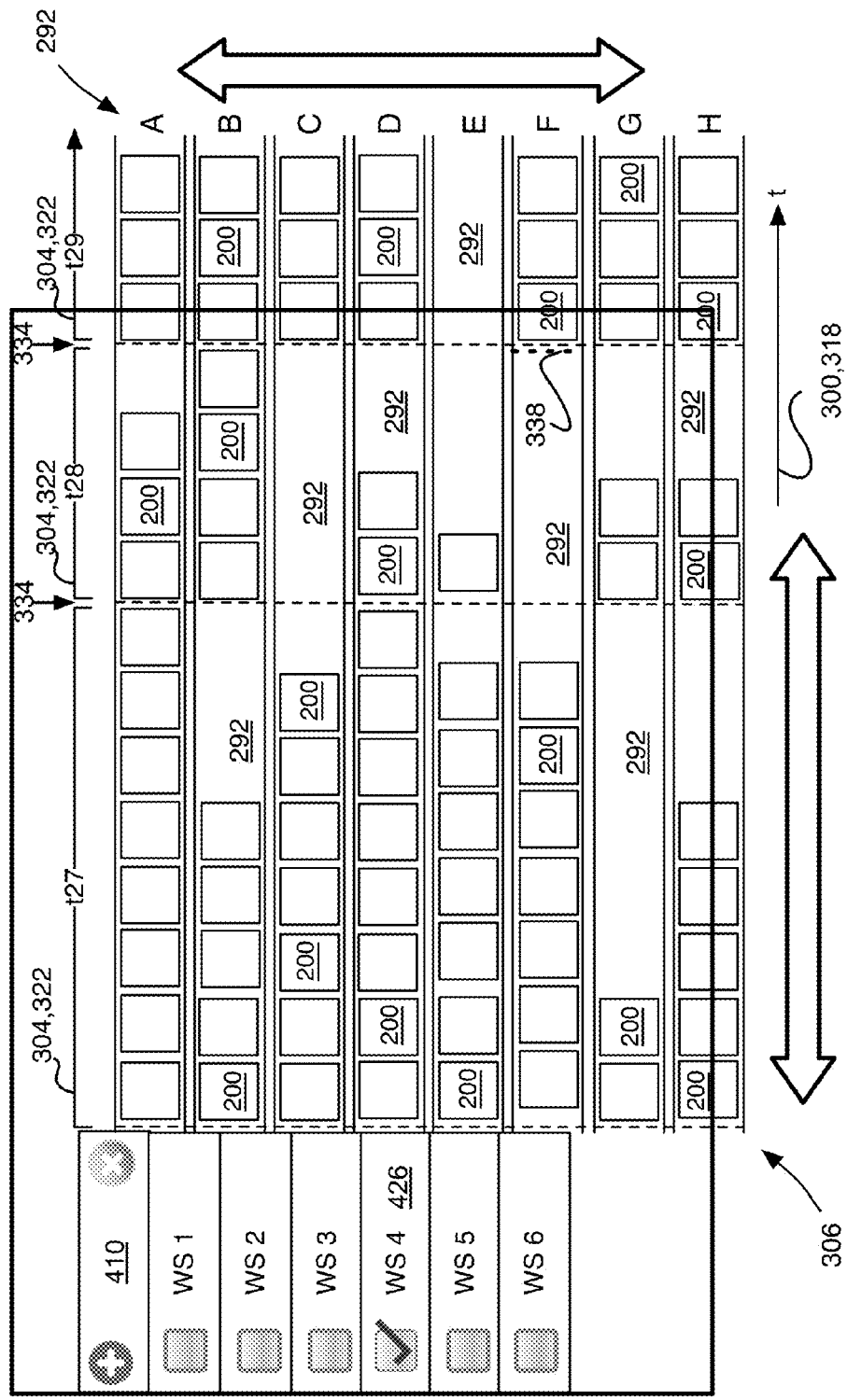
FIG. 42 is a schematic illustration of an interaction tool and a group of axes in accordance with at least one embodiment the present invention.
Figure 43:
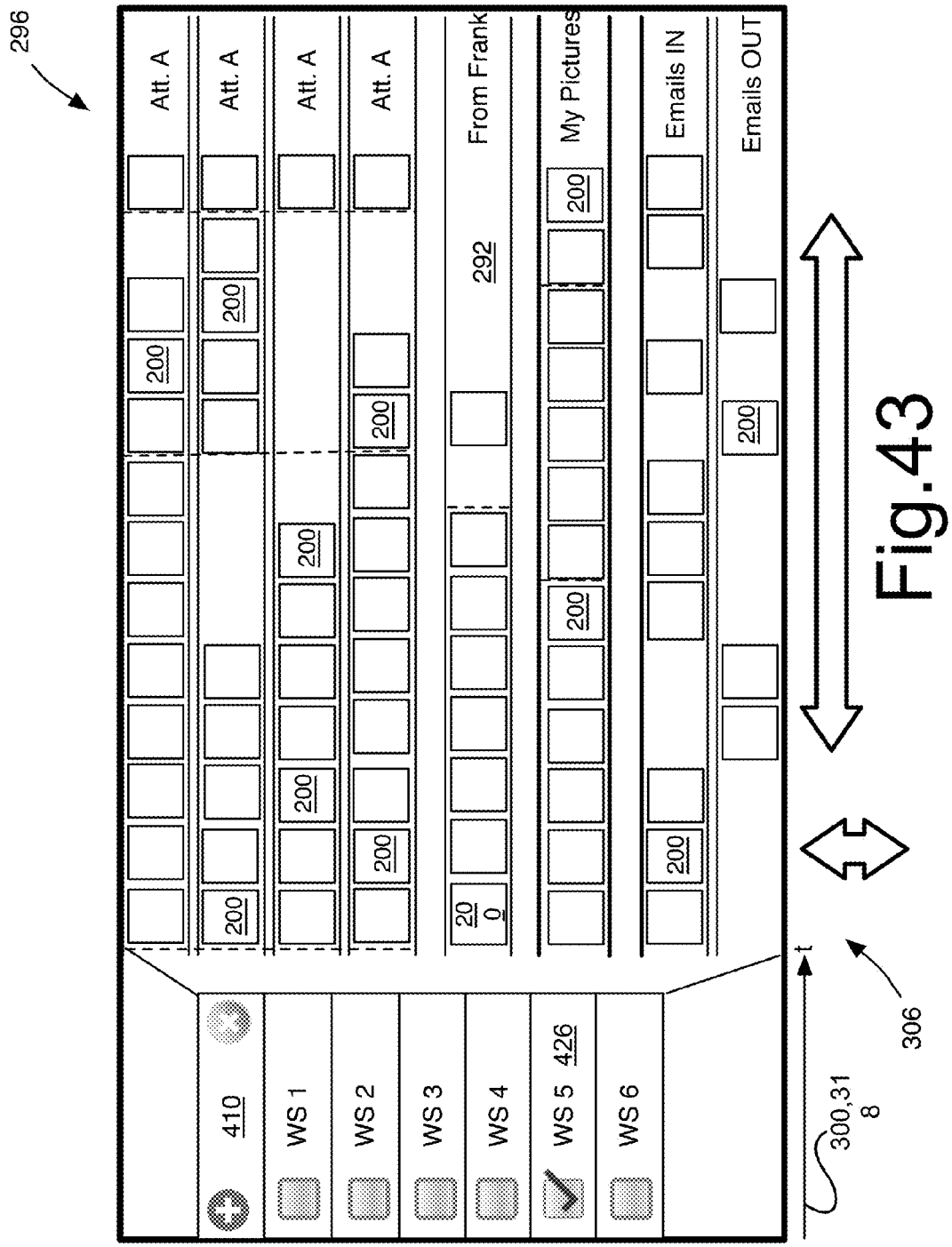
FIG. 43 is a schematic illustration of an interaction tool and a plurality of groups of axes in accordance with at least one embodiment the present invention.

FIG. 42 depicts displaying a predefined workspace 306 of axes 292 upon selection of an interaction element 426 (WS 4). FIG. 43 illustrate a further graphical relation between the selected interaction element 426 WS 5 and its associated workspace 306.

Figure 44:
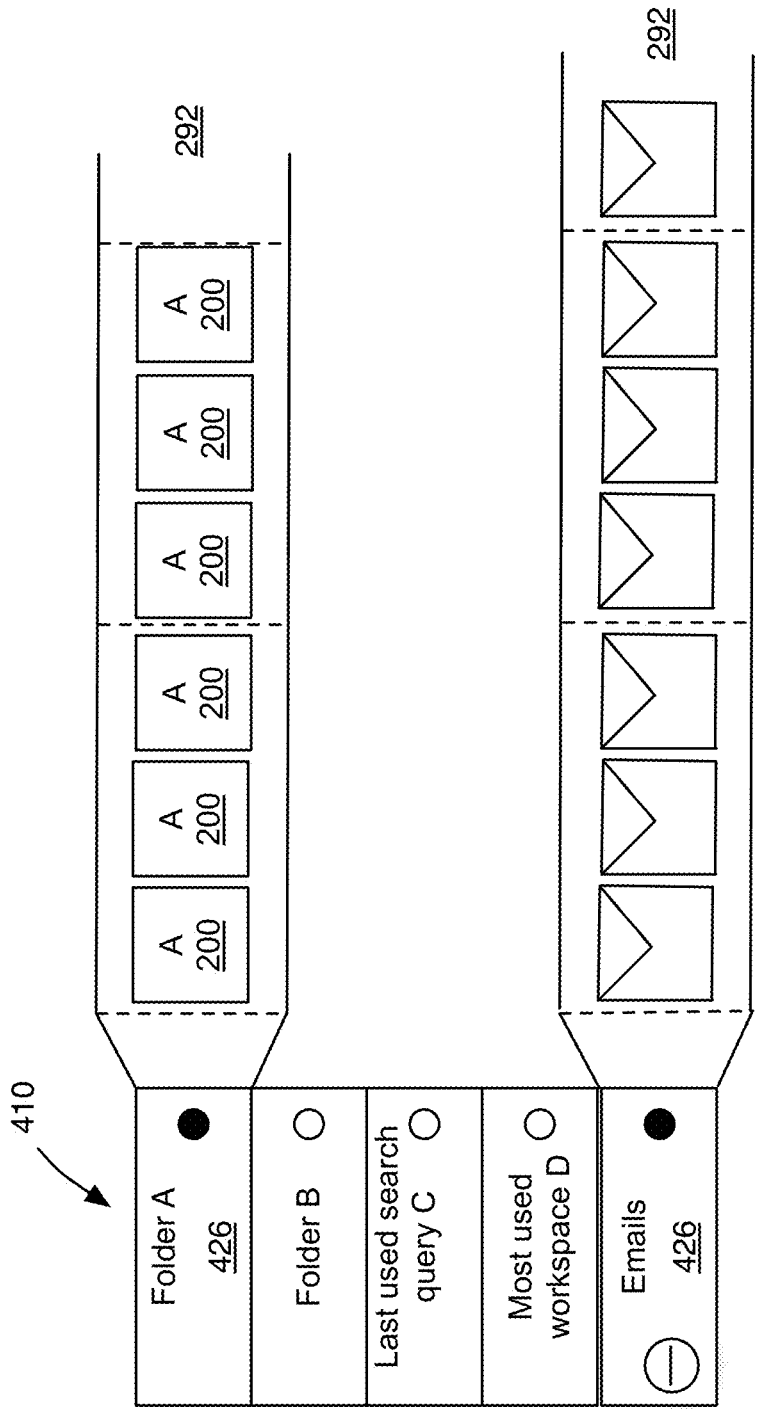
FIG. 44 is a schematic illustration of an interaction tool and a plurality of axes in accordance with at least one embodiment the present invention.
Figure 45:
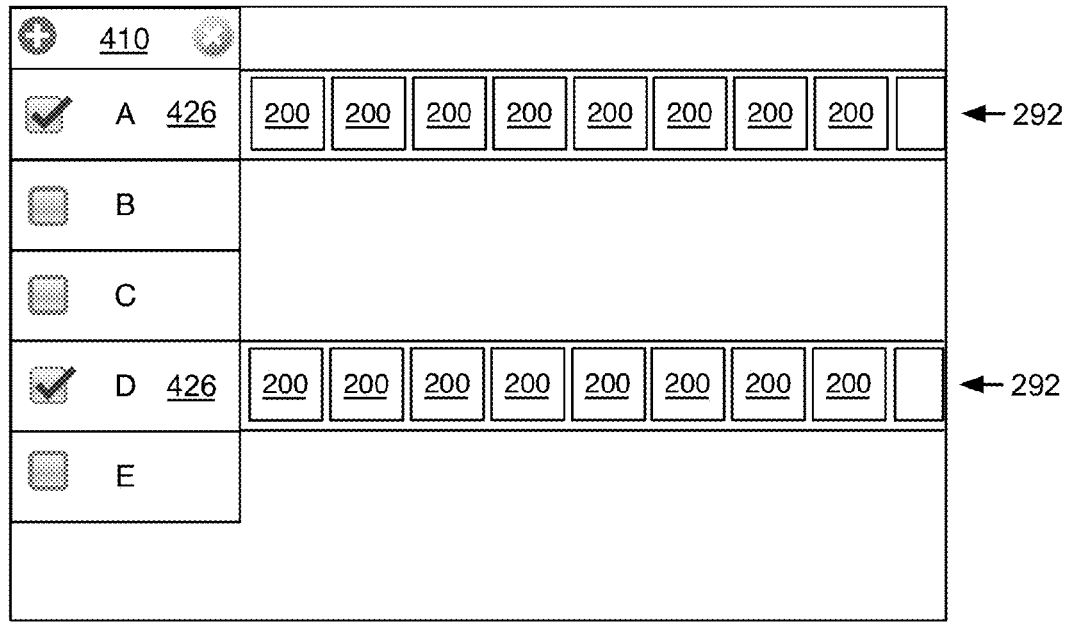
FIG. 45 is a schematic illustration of an interaction tool and a plurality of axes in accordance with at least one embodiment the present invention.
Figure 46:
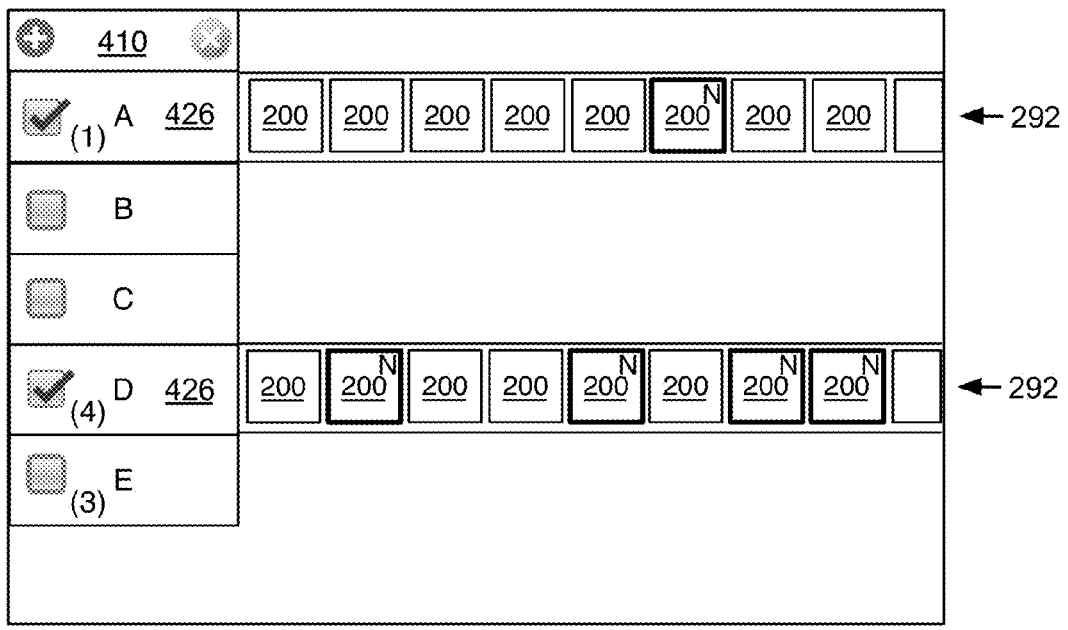
FIG. 46 is a schematic illustration of an interaction tool and a plurality of axes in accordance with at least one embodiment the present invention.

Another embodied graphical relationship between the axes 292 and their originating interaction element 426 is illustrated in FIG. 44 and FIG. 45 where axes 292 are graphically expanding from the interaction tool 410. FIG. 46 provides an example of a further identification of new (or unseen) documents 200 identified by a "N" and a bold frame along the displayed axes 292. Furthermore in FIG. 46, the elements in interaction tool 410 shows the total number of new (or unseen) documents 200.

Figure 47:
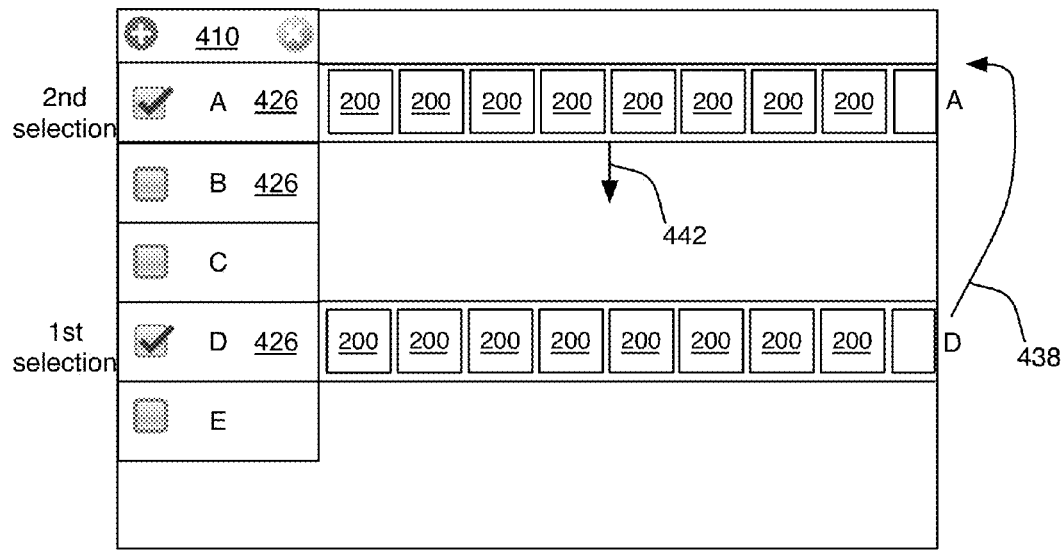
FIG. 47 is a schematic illustration of an interaction tool and a plurality of axes in accordance with at least one embodiment the present invention.
Figure 48:
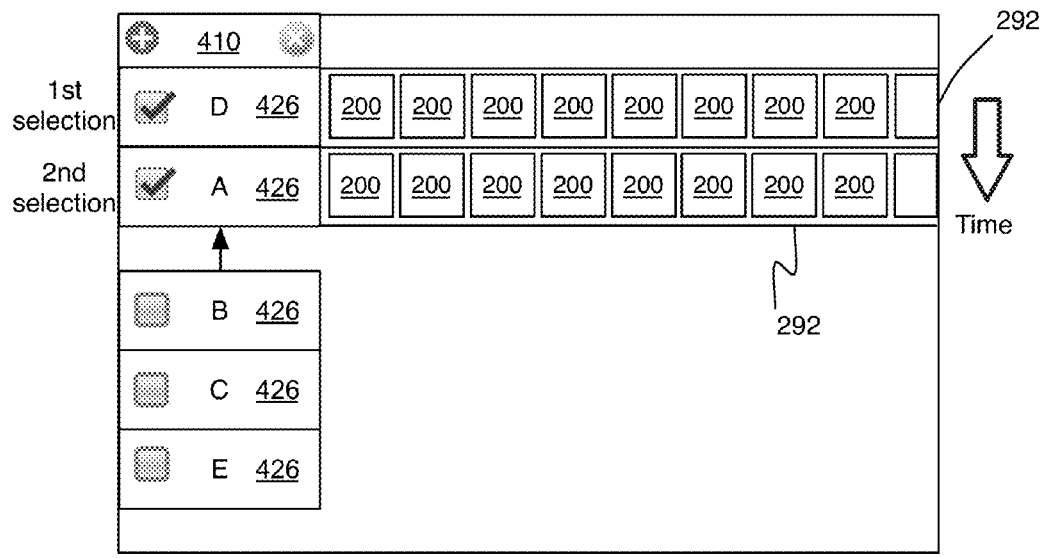
FIG. 48 is a schematic illustration of an interaction tool and a plurality of axes in accordance with at least one embodiment the present invention.
Figure 49:
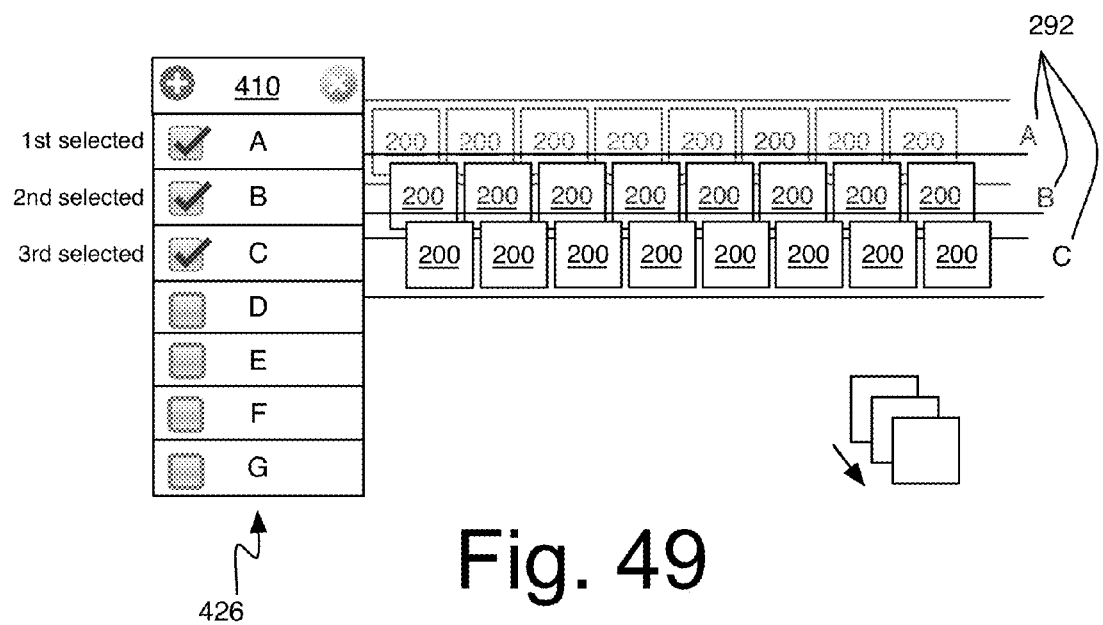
FIG. 49 is a schematic illustration of an interaction tool and a plurality of axes in accordance with at least one embodiment the present invention.
Figure 50:
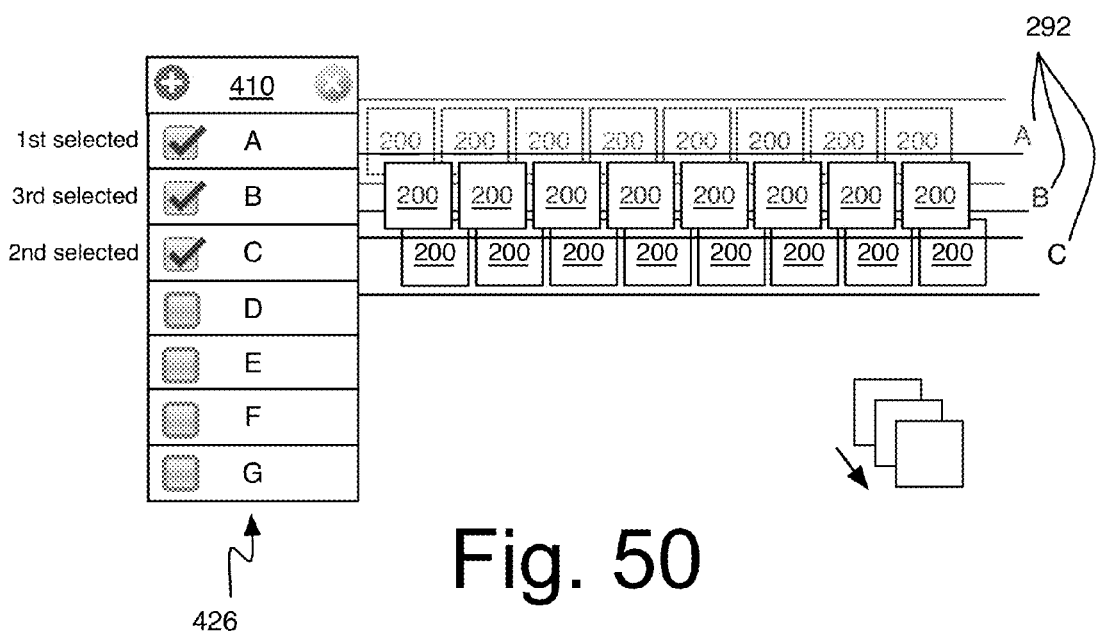
FIG. 50 is a schematic illustration of an interaction tool and a plurality of axes in accordance with at least one embodiment the present invention.

The order of selection of interaction elements 426 can be used to determine the order in which each axis 292 is located and displayed. FIG. 47 illustrates an example where interaction element 426 "D" is firstly selected before interaction element 426 "A". Axis 292 "A" is moved lower to leave room for displaying axis 292 "D" moved 438 above. This provides a chronological display of the axes 292 "D" and "A" as depicted in FIG. 48. Another example of axes 292 ordering in respect with a collation function (chronological in this example) can be appreciated from FIG. 49 and FIG. 50 where the axes are "piled" in accordance with their collation order (order about which the interaction elements 426 are selected).

Figure 51:
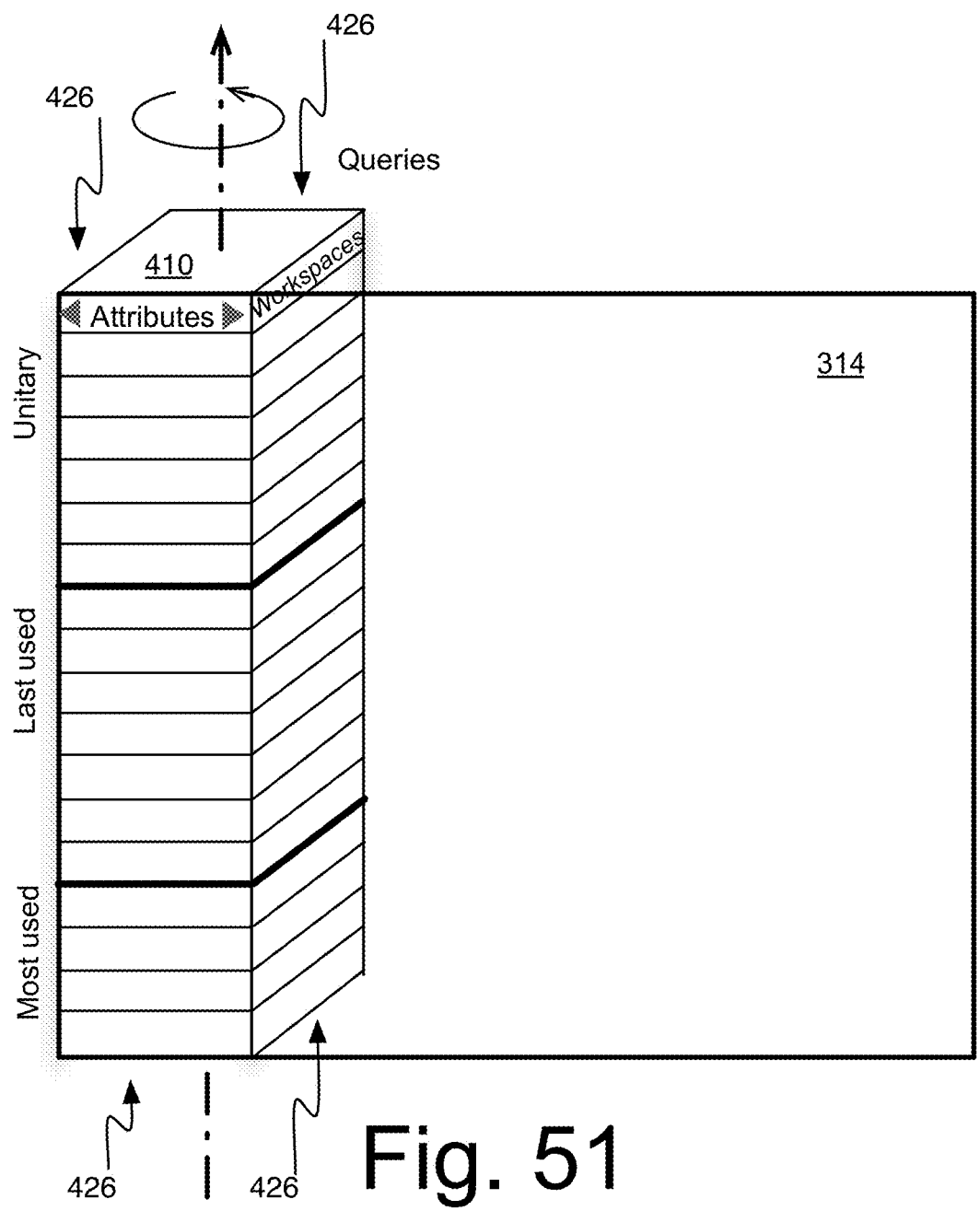
FIG. 51 is a schematic illustration of a multi-faces interaction tool in accordance with at least one embodiment the present invention.
Figure 52:
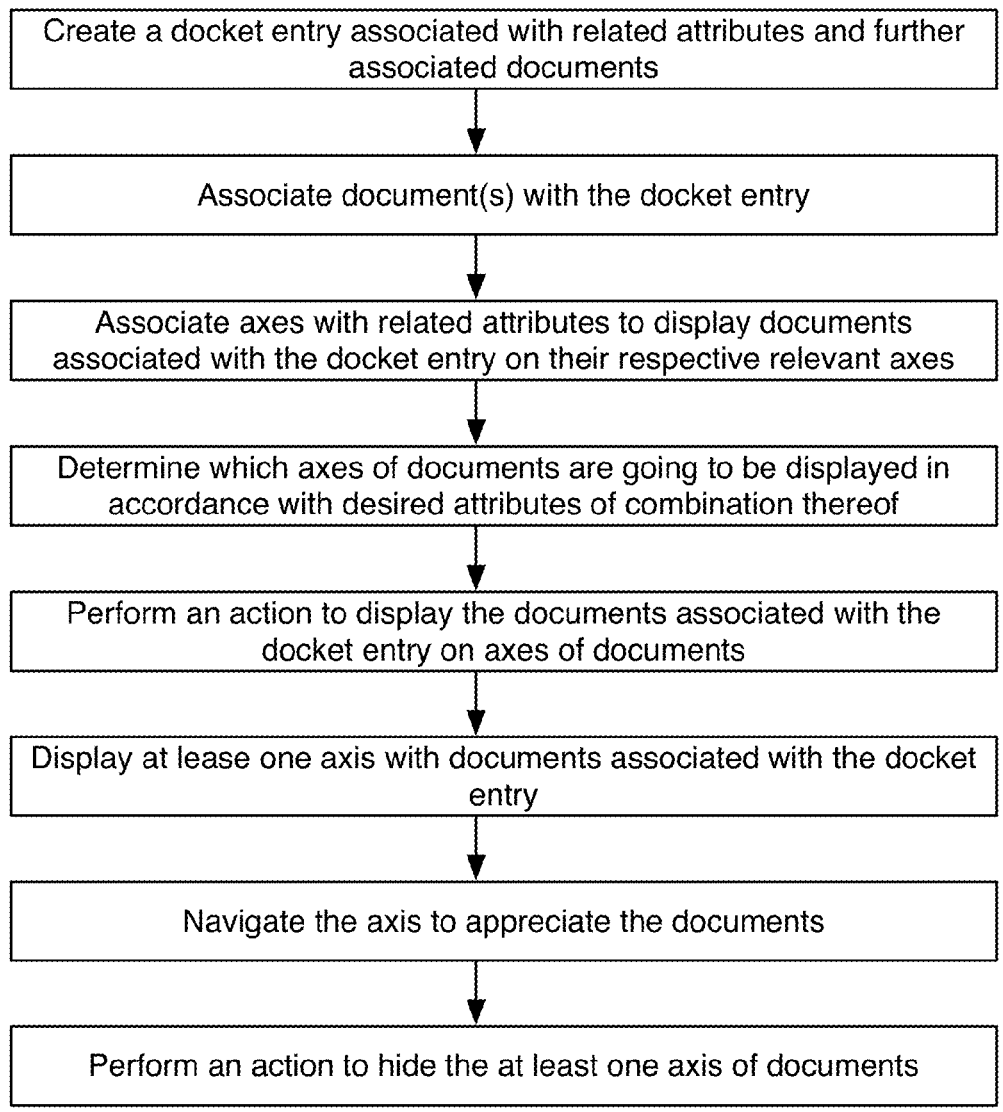
FIG. 52 is a workflow describing of a use case of at least one embodiment of the present invention.
Figure 53:
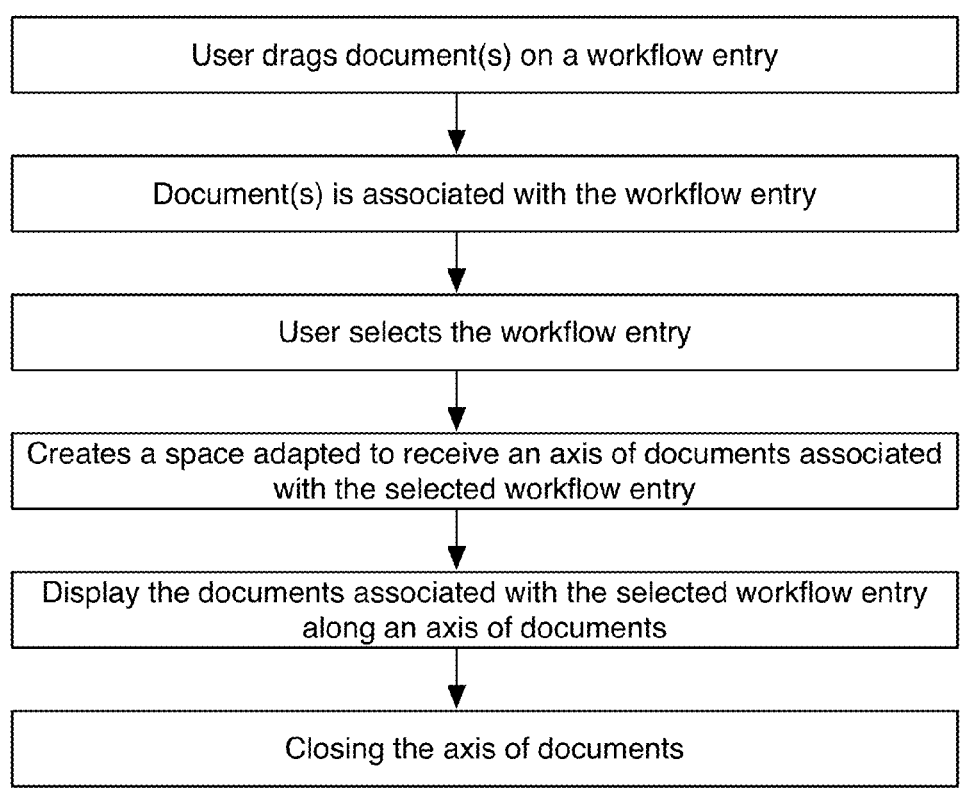
FIG. 53 is a workflow describing of a use case of at least one embodiment of the present invention.

FIG. 51 illustrate a multi-faces interaction tool 410 adapted to display various types of interaction elements 426. Thus allowing to provides a wider array of interaction elements choices to a user using a limited amount of space on a display 314. Finally, FIG. 52 and FIG. 53 are illustrating exemplary flow charts that are self described and representative of exemplary embodiments further discussed above.

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:

1. A computer-implemented method of displaying on a display, for selective viewing by a user, axes of computer-readable files associated with steps of a workflow, the method comprising:
   (a) displaying on a display of a computer system, for view by a user, a GUI comprising a plurality of GUI elements each representing a step of a workflow, the displayed GUI elements being arranged in an ordered sequence; and
   (b) upon receiving user input representing a selection of one of the plurality of displayed GUI elements for displaying an axis of computer-readable files associated with the selected GUI element, further displaying, in an area of the display located after the selected GUI element and before any next displayed GUI element in a direction along the ordered sequence, a portion of an axis of ordered computer-readable files associated with the selected GUI element, with a portion of the axis not being displayed,
      (i) wherein computer-readable files of the displayed portion of the axis are scrollable along the axis,
      (ii) wherein computer-readable files associated with the selected GUI element and located on the portion of the axis that is not displayed are displayable by scrolling along the axis, and (iii) wherein the computer-readable files associated with the selected GUI element and located on the portion of the axis are chronologically ordered along a timeline; and (c) upon receiving user input representing a selection of one of the plurality of displayed GUI elements for ceasing to display an axis of computer-readable files associated with the selected GUI element, ceasing to display the axis in an area of the display located after the selected GUI element and before any next displayed GUI element in a direction along the ordered sequence;

whereby axes of ordered computer-readable files associated with ordered steps of a workflow are selectively viewable by a user on the display.

2. The computer-implemented method of claim 1, wherein an axis of ordered computer-readable files associated with a selected GUI element is displayed along a direction that is orthogonal to a direction along which the ordered GUI elements are displayed.

3. The computer-implemented method of claim 1, wherein displayed computer-readable files of a displayed axis are disposed in a substantially equidistant and rectilinear fashion along the scrollable axis of computer-readable files.

4. The computer-implemented method of claim 1, wherein at least some of the computer-readable files are user-selectable icons.

5. The computer-implemented method of claim 1, wherein the ordered GUI elements are displayed in a chronologically ordered sequence.

6. The computer-implemented method of claim 1, further comprising,
   (a) increasing a spacing between a selected displayed GUI element and a next displayed GUI element in a direction along the ordered sequence upon receiving user input representing a selection of one of the plurality of displayed GUI elements for displaying an axis of computer-readable files associated with the selected GUI element; and
   (b) decreasing a spacing between a selected displayed GUI element and a next displayed GUI element in a direction along the ordered sequence upon receiving user input representing a selection of one of the plurality of displayed GUI elements for ceasing to display an axis of computer-readable files associated with the selected GUI element.

7. The computer-implemented method of claim 3, wherein the computer-readable files of the axis are associated with a common attribute.

8. The computer-implemented method of claim 1, wherein the displaying of step (b) comprises displaying in the area of the display located after the selected GUI element and before any next displayed GUI element in the direction along the ordered sequence, a plurality of axes of ordered computer-readable files each being associated with the selected GUI element.

9. The computer-implemented method of claim 8, wherein the plurality of axes associated with the selected GUI element all share a second timeline.

10. A computer-implemented method of displaying on a display, for selective viewing by a user, axes of computer-readable files associated with steps of a workflow, the method comprising:
    (a) displaying on a display of a computer system, for view by a user, a GUI comprising plurality of GUI elements each representing a step of a workflow, the displayed GUI elements being arranged in an ordered sequence; and
    (b) upon receiving user input representing a selection of one of the plurality of displayed GUI elements for displaying computer-readable files associated with the selected GUI element, further displaying, in an area of the display located after the selected GUI element and before any next displayed GUI element in a direction along the ordered sequence, a plurality of axes of computer-readable files associated with the selected GUI element, the computer-readable files of each axis of the plurality being arranged in an ordered sequence, with a portion of an axis of the plurality being displayed and another portion of the axis not being displayed,
       (i) wherein computer-readable files of the displayed portion of the axis are scrollable along the axis,
       (ii) wherein computer-readable files associated with the selected GUI element and located on the portion of the axis that is not displayed are displayable by scrolling along the axis, and
       (iii) wherein the computer-readable files associated with the selected GUI element and located on the portion of the axis are chronologically ordered along a timeline; and
    (c) upon receiving user input representing a selection of one of the plurality of displayed GUI elements for ceasing to display a plurality of axes of computer-readable files associated with the selected GUI element, ceasing to display the plurality of axes in an area of the display located after the selected GUI element and before any next displayed GUI element in a direction along the ordered sequence;
    whereby axes of ordered computer-readable files associated with ordered steps of a workflow are selectively viewable by a user on the display.

11. The computer-implemented method of claim 10, wherein the plurality of axes of computer-readable files associated with a selected GUI element are displayed in parallel relation to each other along a direction that is orthogonal to a direction along which the ordered GUI elements are displayed.

12. The computer-implemented method of claim 10, wherein displayed computer-readable files of a displayed axis of the plurality are disposed in a substantially equidistant and rectilinear fashion along the scrollable axis of computer-readable files.

13. The computer-implemented method of claim 10, wherein at least some of the computer-readable files are user-selectable icons.

14. The computer-implemented method of claim 10, wherein the ordered GUI elements are displayed in a chronologically ordered sequence.

15. The computer-implemented method of claim 14, wherein the displayed axes associated with the selected GUI element share a second timeline.

16. The computer-implemented method of claim 10, further comprising,
    (a) increasing a spacing between a selected displayed GUI element and a next displayed GUI element in a direction along the ordered sequence upon receiving user input representing a selection of one of the plurality of displayed GUI elements for displaying axes of computer-readable files associated with the selected GUI element; and
    (b) decreasing a spacing between a selected displayed GUI element and a next displayed GUI element in a direction along the ordered sequence upon receiving user input representing a selection of one of the plurality of displayed GUI elements for ceasing to display axes of computer-readable files associated with the selected GUI element.

17. The computer-implemented method of claim 10, wherein displayed computer-readable files of each displayed axis of the plurality are disposed in a substantially equidistant and rectilinear fashion along the scrollable axis of computer-readable files.

18. The computer-implemented method of claim 10, further comprising,
   (a) upon receiving user input representing a selection of one of the plurality of displayed GUI elements for displaying an axis of computer-readable files associated with the selected GUI element wherein only a single axis of ordered computer-readable files is associated with the selected GUI element, further displaying, in an area of the display located after the selected GUI element and before any next displayed GUI element in a direction along the ordered sequence, the single axis of ordered computer-readable files associated with the selected GUI element; and
   (b) upon receiving user input representing a selection of one of the plurality of displayed GUI elements for ceasing to display a single axis of computer-readable files associated with the selected GUI element, ceasing to display the single axis in an area of the display located after the selected GUI element and before any next displayed GUI element in a direction along the ordered sequence.

19. The computer-implemented method of claim 1, further comprising,
   (a) upon receiving user input representing a selection of one of the plurality of displayed GUI elements for displaying computer-readable files associated with the selected GUI element wherein a plurality of axes of ordered computer-readable files are associated with the selected GUI element, further displaying, in an area of the display located after the selected GUI element and before any next displayed GUI element in a direction along the ordered sequence, the plurality of axes of computer-readable files associated with the selected GUI element, the computer-readable files of each axis being arranged in an ordered sequence, with a portion of each axis of the plurality being displayed and another portion of each axis of the plurality not being displayed,
      (i) wherein computer-readable files of the displayed portion of each axis are scrollable along each axis,
      (ii) wherein computer-readable files associated with the selected GUI element and located on the portion of each axis that is not displayed are displayable by scrolling along each axis, and
      (iii) wherein the computer-readable files associated with the selected GUI element and located on the portion of each axis are chronologically ordered along a timeline; and
   (b) upon receiving user input representing a selection of one of the plurality of displayed GUI elements for ceasing to display a plurality of axes of computer-readable files associated with the selected GUI element, ceasing to display the plurality of axes in an area of the display located after the selected GUI element and before any next displayed GUI element in a direction along the ordered sequence.

\* \* \* \* \*